United States Patent
Damzen et al.

(10) Patent No.: US 12,080,987 B2
(45) Date of Patent: Sep. 3, 2024

(54) METHODS AND APPARATUS FOR LASER MODE TRANSFORMATION

(71) Applicant: IMPERIAL COLLEGE INNOVATIONS LIMITED, London (GB)

(72) Inventors: Michael John Damzen, London (GB); William Richard Kerridge-Johns, London (GB)

(73) Assignee: IMPERIAL COLLEGE INNOVATIONS LIMITED, London (GB)

( * ) Notice: Subject to any disclaimer, the term of this patent is extended or adjusted under 35 U.S.C. 154(b) by 505 days.

(21) Appl. No.: 17/277,153

(22) PCT Filed: Sep. 26, 2019

(86) PCT No.: PCT/GB2019/052729
§ 371 (c)(1),
(2) Date: Mar. 17, 2021

(87) PCT Pub. No.: WO2020/065333
PCT Pub. Date: Apr. 2, 2020

(65) Prior Publication Data
US 2021/0376552 A1    Dec. 2, 2021

(30) Foreign Application Priority Data
Sep. 26, 2018 (GB) .................... 1815712

(51) Int. Cl.
*H01S 3/106* (2006.01)
*H01S 3/083* (2006.01)
*H01S 3/105* (2006.01)

(52) U.S. Cl.
CPC .......... *H01S 3/1062* (2013.01); *H01S 3/083* (2013.01); *H01S 3/105* (2013.01); *H01S 2301/203* (2013.01)

(58) Field of Classification Search
CPC ........ H01S 3/083; H01S 3/1062; H01S 3/105; H01S 2301/203; H01S 5/14; H01S 5/141
See application file for complete search history.

(56) References Cited

U.S. PATENT DOCUMENTS

2001/0010599 A1* 8/2001 Lefevre .................. H01S 5/141
359/633
2006/0215713 A1* 9/2006 Flanders ................. H01S 5/141
372/98

(Continued)

FOREIGN PATENT DOCUMENTS

WO    WO 01/03258       1/2001
WO    WO 2004/019017    3/2004

OTHER PUBLICATIONS

Naik, "Ultrashort vortex from a Gaussian pulse—An achromaticinterferometric approach," May 2017, Scientific Reports, 7: 2395 | DOI:10.1038/s41598-017-02613-3, p. 1-3. (Year: 2017).*

(Continued)

*Primary Examiner* — Michael Carter
(74) *Attorney, Agent, or Firm* — Barnes & Thornburg LLP

(57) ABSTRACT

A method for generating a spatially transformed optical output from a laser system, the method comprising: disposing a laser gain medium within a laser cavity structure; arranging an interferometric device to complete the laser cavity structure, wherein the interferometric device receives an input beam from laser oscillation in the laser cavity structure, splits the input beam into two sub-beams, and recombines the two sub-beams to provide an optical feedback beam to sustain laser oscillation; configuring the optical components that comprise the interferometric device to provide relative misalignment of the two sub-beams that are produced internally to the interferometric device; using at least a first output port of the interferometric device to provide an output beam of the laser system that due to the misalignment is a spatial transformation of the internal mode structure of the laser; and using at least a second output port of the interferometric device to provide the optical feedback beam to the laser cavity structure that sustains laser oscillation with a spatial structure that substantially preserves the internal mode structure of the laser. An apparatus which implements such a method is also provided.

15 Claims, 13 Drawing Sheets

(56) References Cited

U.S. PATENT DOCUMENTS

2015/0030041 A1* 1/2015 Pai .................. H01S 5/141
372/20
2015/0139263 A1* 5/2015 Sutter ................ H01S 5/142
372/70

OTHER PUBLICATIONS

Chandra, "Reflection Properties and Applications of Resonant Optical Cavities," Optics Letters, Optical Society of America, 7(11): 532-534 (Nov. 1, 1982).

International Search Report and Written Opinion for PCT/GB2019/052729, dated Jan. 23, 2020, 15 pp.

Kerridge-Johns et al., "Vortex Laser by Transforming Gaussian mode with an interferometric output coupler," Optics Express, 27(8): 11642 (Apr. 15, 2019).

Smith, "Mode Selection in Lasers," Proceedings of the IEEE, 60(40): 422-440 (1972).

Stoykova, "Strong Optical Asymmetry of an Interference Wedge With Unequal-Reflectivity Mirrors and Its Use in Unidirectional Ring Laser Designs," Optics Letters, Optical Society of America, 19(23): 1925-1927 (Dec. 1, 1994).

Takashige et al., "Wavelength-Versatile optical vortex lasers," Journal of Optics, 19(12): 123002 (Nov. 20, 2017).

* cited by examiner

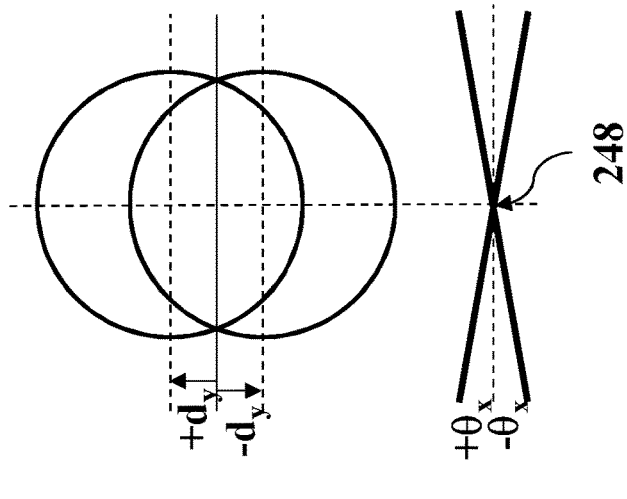
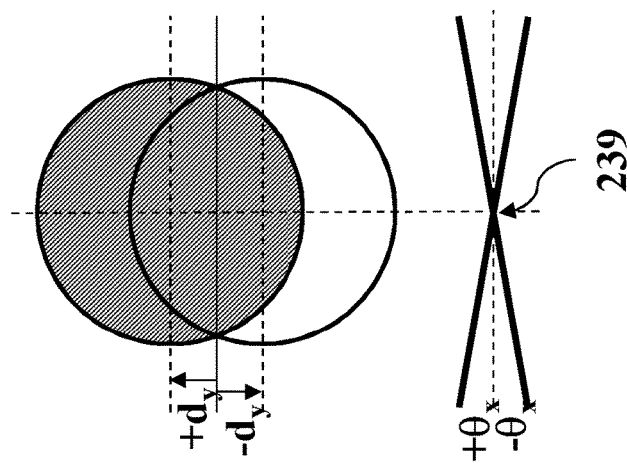
Fig. 5

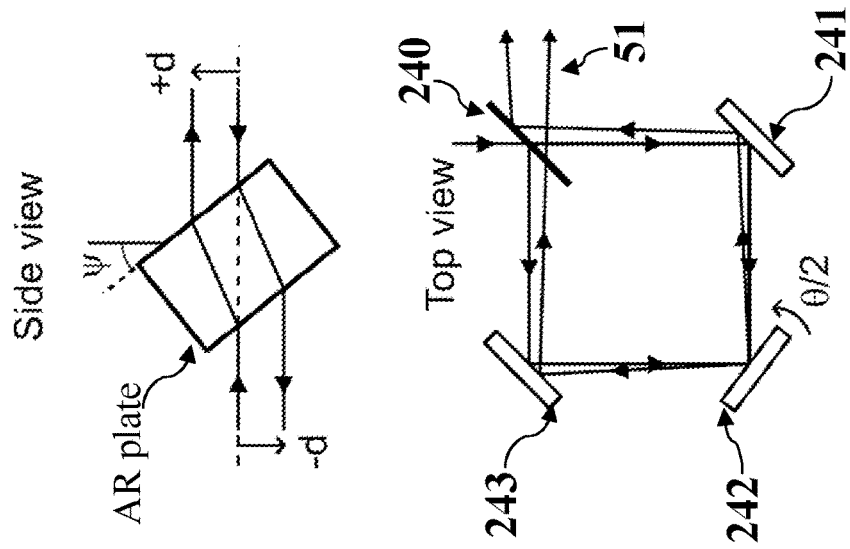
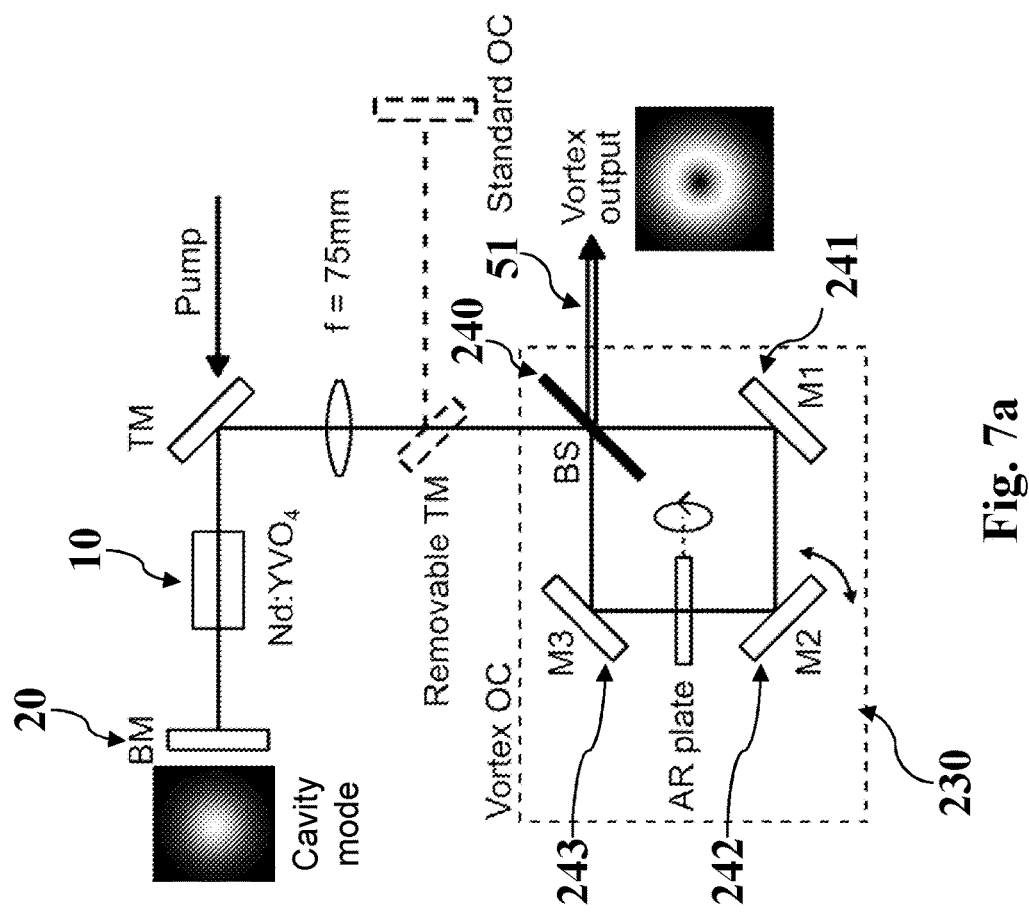
Fig. 7a
Fig. 7b
Fig. 7

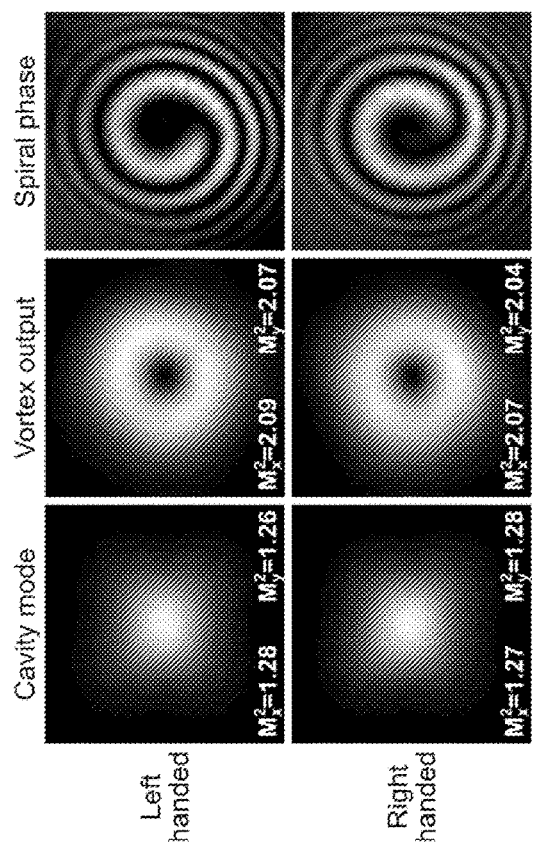
Fig. 8a
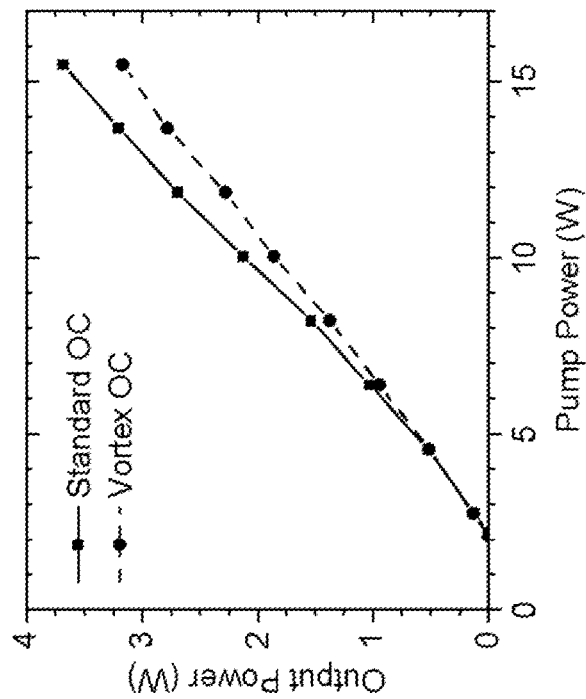
Fig. 8b
Fig. 8

| Internal laser mode | Mode transformed output from misaligned interferometer laser | | |
|---|---|---|---|
| | Positive vorticity case / Negative vorticity case | | |
| $LG_{00}$ | $LG_{01}$ / $LG_{0,-1}$ | $LG_{02}+LG_{00}$ / $LG_{10}$ | $LG_{03}+LG_{01}$ / $LG_{11}$ |
| $LG_{01}$ | | | |
| $LG_{02}$ | | | |

Fig. 9

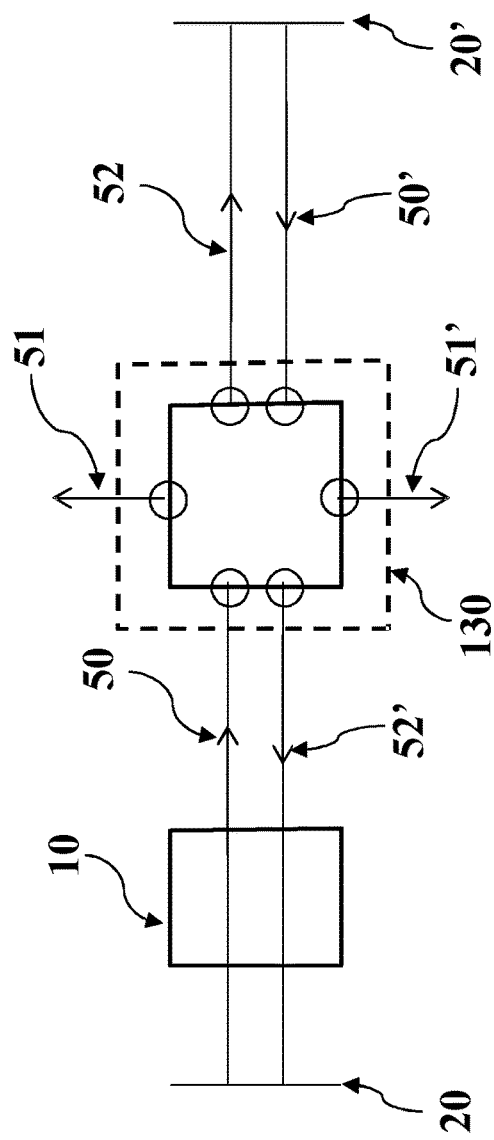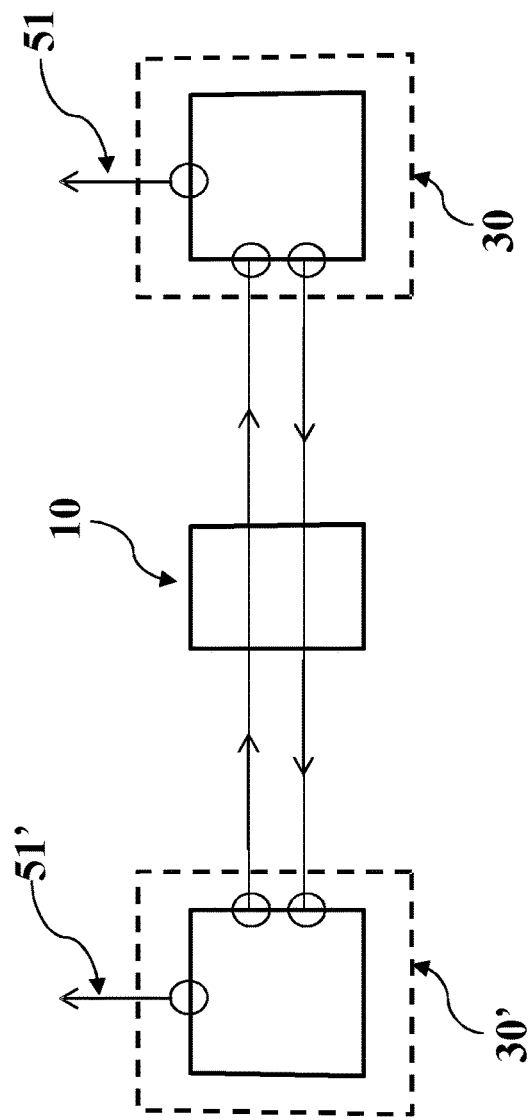

METHODS AND APPARATUS FOR LASER MODE TRANSFORMATION

This application is a U.S. national stage application under 35 U.S.C. § 371 of PCT Application No. PCT/GB2019/052729, filed on Sep. 26, 2019, which claims priority from Great Britain Application No. GB 1815712.3, filed on Sep. 26, 2018, the entirety of which are each hereby fully incorporated by reference herein.

FIELD OF THE INVENTION

The present invention relates to the creation of the spatial transformation of light within a laser system. More specifically it teaches how to integrate an interferometric device into a laser system and, by appropriate misalignment and phasing of said interferometric device, to provide a spatially transformed output from the laser, substantially without producing spatial disruption to the internal laser mode.

BACKGROUND TO THE INVENTION

The majority of lasers are designed to provide an optical output with Gaussian transverse spatial form, as these beams possess the best brightness (for a given laser power) providing the highest directionality and the best ability for focusing to the smallest spot size compatible with the physical laws of diffraction.

However, the Gaussian spatial form is not the best for all applications. Other structured light patterns can provide advantages better matched to some applications, and these light patterns can also possess additional properties enabling new opportunities and benefits.

By way of example, one important set of spatial light forms are vortex light beams. These beams are characterised by having spiral (azimuthal) phase structure that notably can possess orbital angular momentum. In their simplest form, these beams have an annular (ring) intensity profile. They have a zero field amplitude at their centre due to the phase singularity at this position. These beams have lower brightness than the Gaussian spatial format; however, the annular structure and orbital angular momentum of vortex beams have additional properties not possessed by Gaussian beams. These spatial structures can provide new capabilities in particle trapping, micromanipulation, optical levitation and mechanical rotation by transferring orbital angular momentum to the material system. Amongst their many other potential scientific and commercial benefits, vortex beams can enhance the efficiency of some laser manufacturing processes, and provide advantages in high-resolution microscopy, free-space communications, metrology and sensing.

Whilst lasers, in principle, can directly generate vortex beams in the form of what are known as Laguerre-Gaussian modes, in practice the methods for their creation and selection are awkward and compromised by any cavity deviation from cylindrical symmetry. Even if these symmetry conditions are met the mode purity and handedness of vorticity is hard to control. Whilst some bespoke methods have been demonstrated for vortex generation directly from a laser, the generation of vortex beams is predominantly done by converting a Gaussian beam externally to the laser, using mode conversion techniques such as spiral phase plates, Q-plates and spatial light modulators. The spatial light modulator (SLM) has become a primary technology for generating almost any light pattern one could want because of its flexibility using computer programmability, but these devices have very low power-handling capability and are expensive, which are major limitations. As a result, to date, relatively little progress has been made for high power vortex generation and even less for high efficiency, robust and compact systems, yet these are key requirements for uptake in industrial applications and operation in commercial out-of-the-research-lab environments.

There is therefore a desire for an industrially-applicable technique for spatially transforming light within a laser system, that can be applied e.g. to the generation of high power vortex beams.

SUMMARY OF THE INVENTION

Aspects of the present invention are set out in the appended independent claims, while particular embodiments of the invention are set out in the appended dependent claims.

According to a first aspect of the invention there is provided a method for generating a spatial transformation of the output from a laser system, the method comprising:
  disposing a laser gain medium within a laser cavity structure;
  arranging an interferometric device to complete the laser cavity structure, wherein the interferometric device receives an input beam from laser oscillation in the laser cavity structure, splits the input beam into two sub-beams, and recombines the two sub-beams to provide a feedback beam to sustain laser oscillation;
  configuring components of the interferometric device to provide relative misalignment of the two sub-beams that are produced internally to the interferometric device;
  using at least a first output port of the interferometric device to provide an output beam of the laser system that due to the misalignment is a spatial transformation of the internal mode structure of the laser; and
  using at least a second output port of the interferometric device to provide the feedback beam to the laser cavity structure that sustains laser oscillation with a spatial structure that substantially preserves the internal mode structure of the laser.

The present invention teaches the converse of standard laser practice with respect to the requirement for precise alignment of interferometric devices in a laser system. It teaches that with the right methodology and appropriate use of apparatus there can be considerable advantages of deliberate misalignment of the interferometric element of a laser system.

The invention teaches that the misalignment can be configured to provide an output that is spatially transformed compared to the internal mode of the laser and, perhaps most surprisingly, with the methodology of this invention, that this can be achieved with substantially minimal disruption to the operation of the original internal laser mode that would occur without misalignment.

In one particular implementation of this invention a laser that utilises the methods of this invention and operates on a fundamental Gaussian-type of mode can have an output converted to a vortex mode whilst its internal mode remains substantially Gaussian.

It will be clear to those skilled in the art that the inventive methods and embodiments of this invention that will be described provide manifold and substantial benefits over other methods for mode transformation and particularly for vortex generation. One major benefit from using the methodology and apparatus provided by this invention is the ability to operate at very high powers as may be required, by way of example, for industrial applications such as laser material processing where hundreds of Watts or even multi-kilowatt powers are usually required. This is achievable as the apparatus required for our methodology allows the use of high-damage threshold elements such as mirrors and beam-splitters, which are standard components already used and validated in high power laser. Furthermore, the methods of the invention allow use of low insertion loss elements allowing high efficiency operation. Laser operation with mode transformation can be achieved across different wavelengths without requiring bespoke manufactured wavelength-specific optical elements (e.g. spiral phase plates and Q-plates) that limit their operation. Compared to many other direct laser vortex generation methods, our invention allows easy control of the handedness of vorticity. Furthermore, the apparatus required for this invention involves use of low cost elements. These benefits of high power, high efficiency, flexibility for wavelength operation and low cost are all major drivers for commercial laser development and applications in many market sectors, therefore this invention offers significant opportunity for scientific, industrial, medical and commercial applications.

There is a large body of prior art on the use of interferometers and their use for precision measurements and also as the basis for spectral control of lasers. There are numerous forms of interferometer. Many use a partially reflecting mirror as a beamsplitter to divide the light amplitude to follow different paths and a further beamsplitter or the same beamsplitter to recombine the light. Common examples of such interferometers include the Michelson interferometer, the Mach-Zehnder interferometer, the Sagnac interferometer, and the Fabry-Perot interferometer, but many others exist.

Incorporating an additional interferometric device into a laser has also been used in prior art systems, usually to achieve enhanced spectral control (see e.g. P. W. Smith, "Mode Selection in Lasers", Proc of the IEEE, 60, 422 (1972)). The underlying laser cavity that commonly is used to form the basis of nearly all laser devices is itself an interferometer. Commonly, a laser cavity is formed by a pair of cavity mirrors and this is a Fabry-Perot interferometer. It will be well-known to those skilled in the art that the resonant condition for laser mode formation is dependent on the cavity path length of this interferometer system which determines the allowed frequencies (or wavelengths) at which the laser can operate effectively.

When further interferometers are placed inside the laser cavity additional sub-cavities are formed and their additional resonance conditions provides further selection of preferred frequencies that have the least loss to favour their growth in the laser cavity. For example, placing a Fabry-Perot interferometer in the form of a parallel-plate etalon inside the laser cavity is a common way to allow spectral narrowing and/or wavelength tuning. In a further example, introducing an internal beamsplitter to the laser cavity to form an additional arm of the cavity with a further end mirror forms a Michelson interferometer structure that provides two coupled cavities creating additional spectral selection.

A key feature of lasers using internal interferometric devices in prior art systems is that the interferometer sub-systems are configured to be in a good, if not excellent, alignment. By doing so the internal spatial mode of the laser can be preserved at the same time, as the constructive interference condition of the sub-cavities formed by the interferometer elements provides the intended goal of selection of laser frequencies. However, if the interferometric elements or sub-cavities of such systems are misaligned, the laser would be expected to be spatially disrupted and its efficiency of operation impaired.

For example, the two mirrors of a simple laser cavity are typically very carefully aligned to be parallel, so that the internal laser light can resonate back and forth through the gain medium along the cavity axis with lowest diffractive losses. If the laser cavity mirrors are misaligned, then the laser mode will deviate from a path along the cavity axis. This will lead to beam walk-off and can result in power reduction due to increased diffraction losses. Furthermore, the internal spatial mode can be disrupted from a Gaussian into a higher-order mode or mode superposition with lower brightness. Such a higher-order mode structure may be desirable for a given application but in general it will be more poorly matched to the limited aperture of the gain medium and ultimately with sufficient misalignment the cavity will even cease to oscillate. So this method of mode control is not generally a suitable one and is not commonly used in scientific or commercial laser systems.

Similarly, when additional interferometric elements are incorporated into a laser architecture there will be created sub-cavities in a laser, and these are configured to be well-aligned in prior art. For example, when adding a Fabry-Perot etalon as an internal element inside the laser cavity it is made with parallel surfaces, usually to an exquisite accuracy of ½0th or even ¹⁄₁₀₀th of a wavelength of parallelism. In more complex cavity structures with, for example, an internal beamsplitter forming interferometric arms as in the case of the Michelson interferometer laser, these further sub-cavities formed are also configured to be well-aligned. If these are not well-aligned with respect to the main laser cavity then spatial disruption of the internal mode can be expected to also occur, due to reflections from sub-cavities going in different directions to the main cavity axis and creating unwanted losses and uncontrolled interference that occur at the combining beamsplitter.

The prior art therefore teaches that misalignment of a laser cavity and its interferometric elements is negative to laser performance.

The present invention teaches the converse of this standard laser practice with respect to the requirement for precise alignment of interferometric devices in a laser system. It teaches that with the right methodology and appropriate use of apparatus there can be considerable advantages of deliberate misalignment of the interferometric element of a laser system.

According to a second aspect of the invention there is provided an apparatus for generating a spatial transformation of the output from a laser system, the apparatus comprising:

a laser gain medium disposed within a laser cavity structure; and an interferometric device arranged to complete the laser cavity structure, wherein the interferometric device is configured to receive an input beam from laser oscillation in the laser cavity structure, to split the input beam into two sub-beams, and to recombine the two sub-beams to provide a feedback beam to sustain laser oscillation;

wherein components of the interferometric device are configured to provide relative misalignment of the two sub-beams that are produced internally to the interferometric device;

at least a first output port of the interferometric device is configured to provide an output beam of the laser system that due to the misalignment is a spatial transformation of the internal mode structure of the laser; and at least a second output port of the interferometric device is configured to provide the feedback beam to the laser cavity structure to sustain laser oscillation with a spatial structure that substantially preserves the internal mode structure of the laser.

BRIEF DESCRIPTION OF THE DRAWINGS

Embodiments of the invention will now be described, by way of example only, and with reference to the drawings in which:

FIG. 5 is a diagram showing a combined displacement and angular misalignment technique in respect of an interferometric device according to an embodiment of the invention;

FIG. 7 is a diagram of an experimental system constructed to demonstrate the operation of the invention with a misaligned Sagnac interferometer incorporated as part of a laser system;

FIG. 8 shows results of the experimental system with a misaligned Sagnac interferometer incorporated as part of a laser system, demonstrating some important properties of this invention;

FIG. 9 is a diagram of some examples of mode transformations that can be produced using the invention when the internal laser mode is a Gaussian or is itself a vortex mode;

FIG. 12 is a diagram of further elaborations of embodiments of the invention.

In the figures, like elements are indicated by like reference numerals throughout.

DETAILED DESCRIPTION OF PREFERRED EMBODIMENTS

Figure 1:
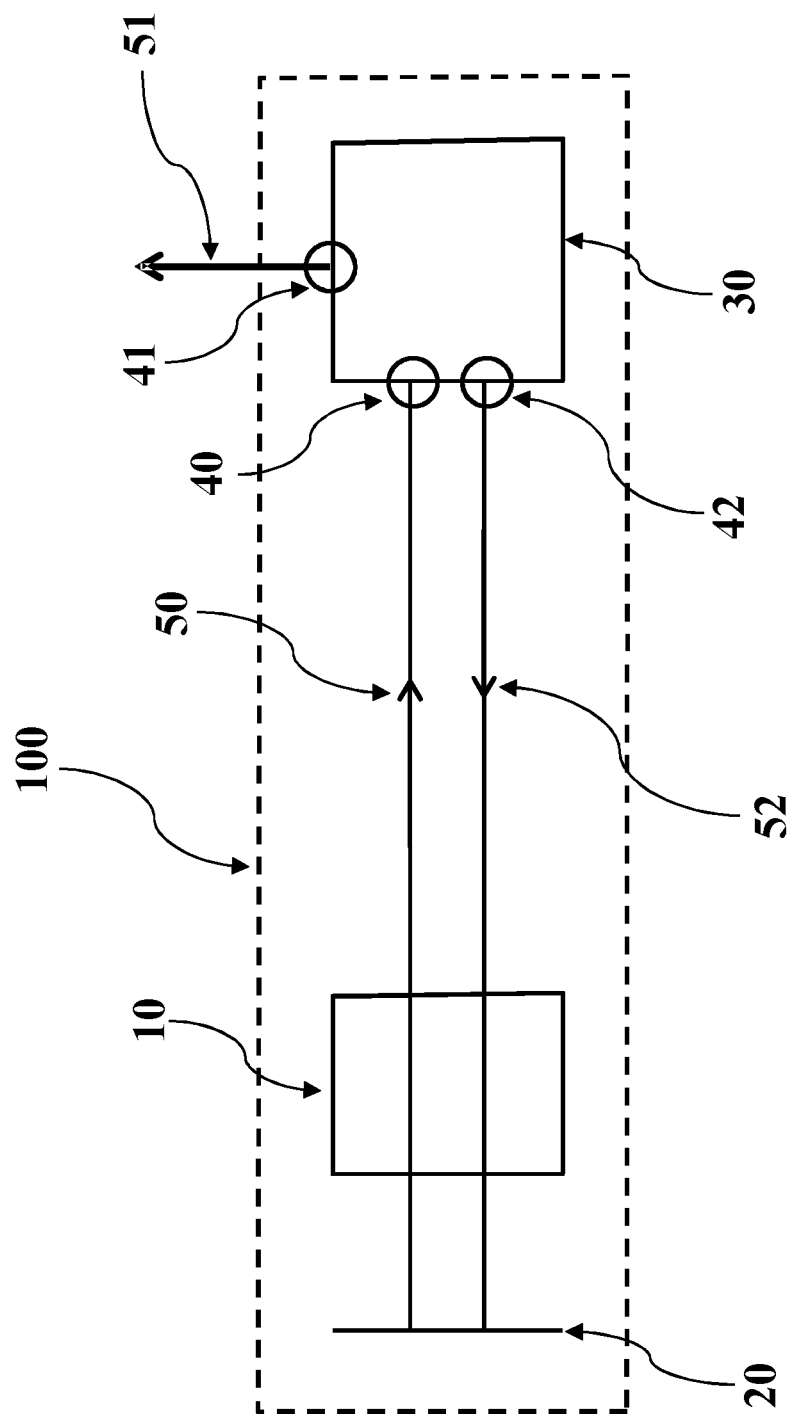
FIG. 1 is a diagram showing a laser system incorporating an interferometric device according to an embodiment of the invention.

FIG. 1 shows the features of a laser system 100 with a gain medium 10 and incorporating an integrated interferometric device 30 according to one embodiment of this invention. The laser cavity is formed between a back reflector 20 and the interferometric device 30 to form laser oscillation in the laser cavity with laser mode propagating in the forwards direction 50 and backwards direction 52. The interferometric device 30 in this embodiment has three ports: an input port 40 that receives as an input the forwards mode 50; a first output port 41 that produces a mode transformed output 51; and a second output port (or "feedback" port) 42 that provides a return feedback to the laser cavity to form the backwards mode 52 and complete the laser cavity and sustain the laser oscillation. A key feature of this laser embodiment is that the interferometric device 30 is deliberately misaligned according to the methodology of this invention, as will be described. In a standard laser of prior art, using a laser cavity with conventional mirror reflectors, the output spatial form is substantially the same as the intracavity laser mode form by using a partial transmission through one of the cavity reflectors. However, by using the methodology of this invention, the spatial form of the output mode 51 from the first output port 41 of the interferometric device 30 can be substantially different to the form of the intracavity laser mode 50, but the spatial form of the feedback mode 52 from the feedback port 42 can be substantially the same as the laser mode 50 except propagating in the reverse sense and with an attenuated power consistent with the loss of power out-coupled at the first output port 41.

Figure 2:
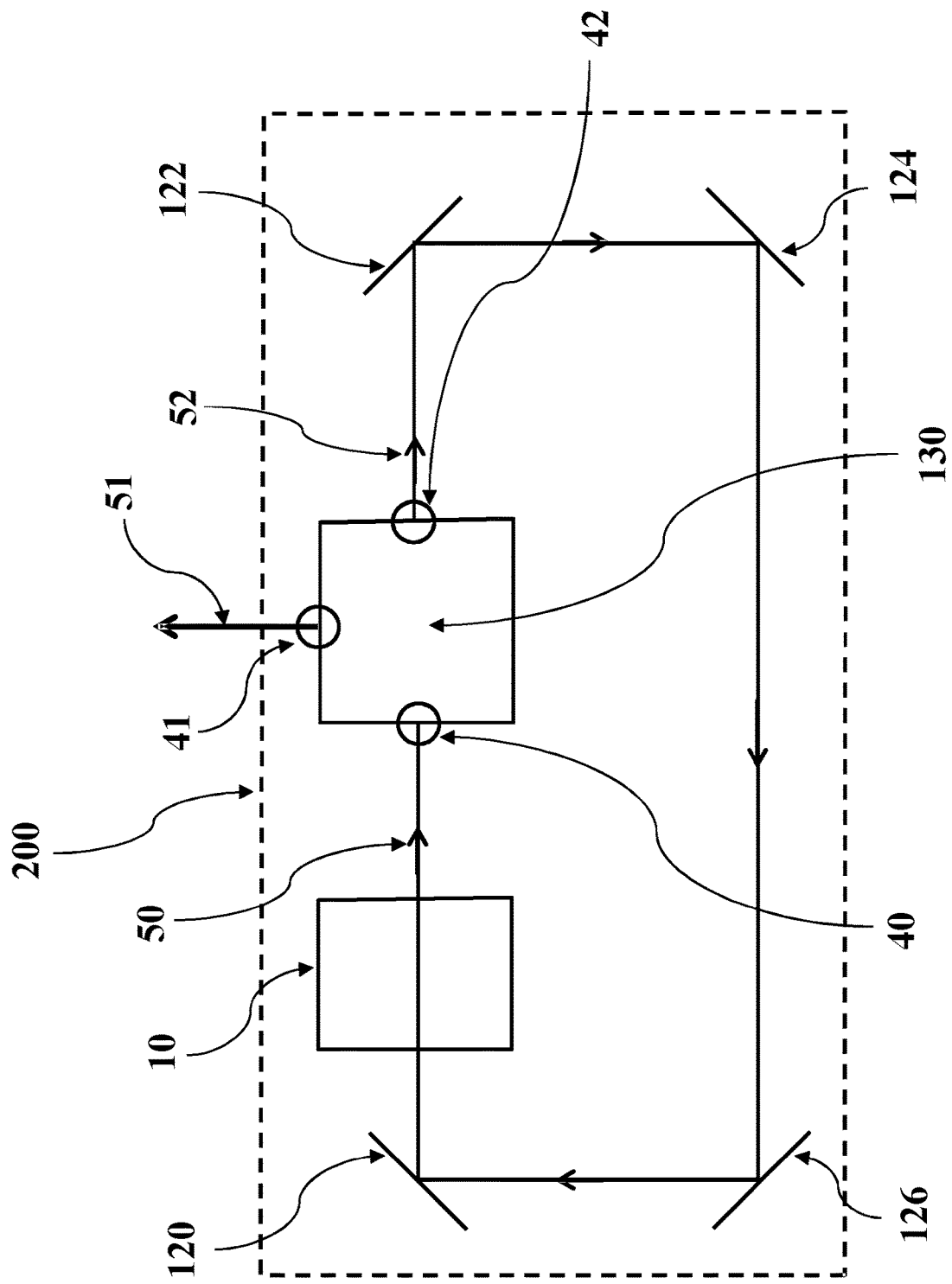
FIG. 2 is a diagram showing a laser system incorporating an interferometric device according to another embodiment of the invention.

FIG. 2 shows the features of a further laser system 200 with a gain medium 10 incorporating another form of integrated interferometric device 130 according to another embodiment of this invention. The laser cavity is a ring cavity formed between reflectors 120, 122, 124, and 126, with the ring path completed by passage through the said interferometric device 130 to form laser oscillation in the laser cavity. The interferometric device 130 in this embodiment has three ports: an input port 40 that receives as an input a forward cavity mode 50; a first output port 41 that produces a mode transformed output mode 51; and a second output port (or "feedback" port) 42 that provides a feedback to the laser cavity to form the onwards-going mode 52 to complete the laser cavity and sustain the laser oscillation. This laser embodiment also has the interferometric device 130 with deliberate misalignment according to the methodology of this invention, as will be described, with spatially transformed output 51 from the first output port 41 of the interferometric device 130 and spatial form of the feedback mode 52 from the feedback port 42 that is substantially the same as the input laser mode 50 except with an attenuated power consistent with the loss of power out-coupled at the first output port 41.

Figure 3:
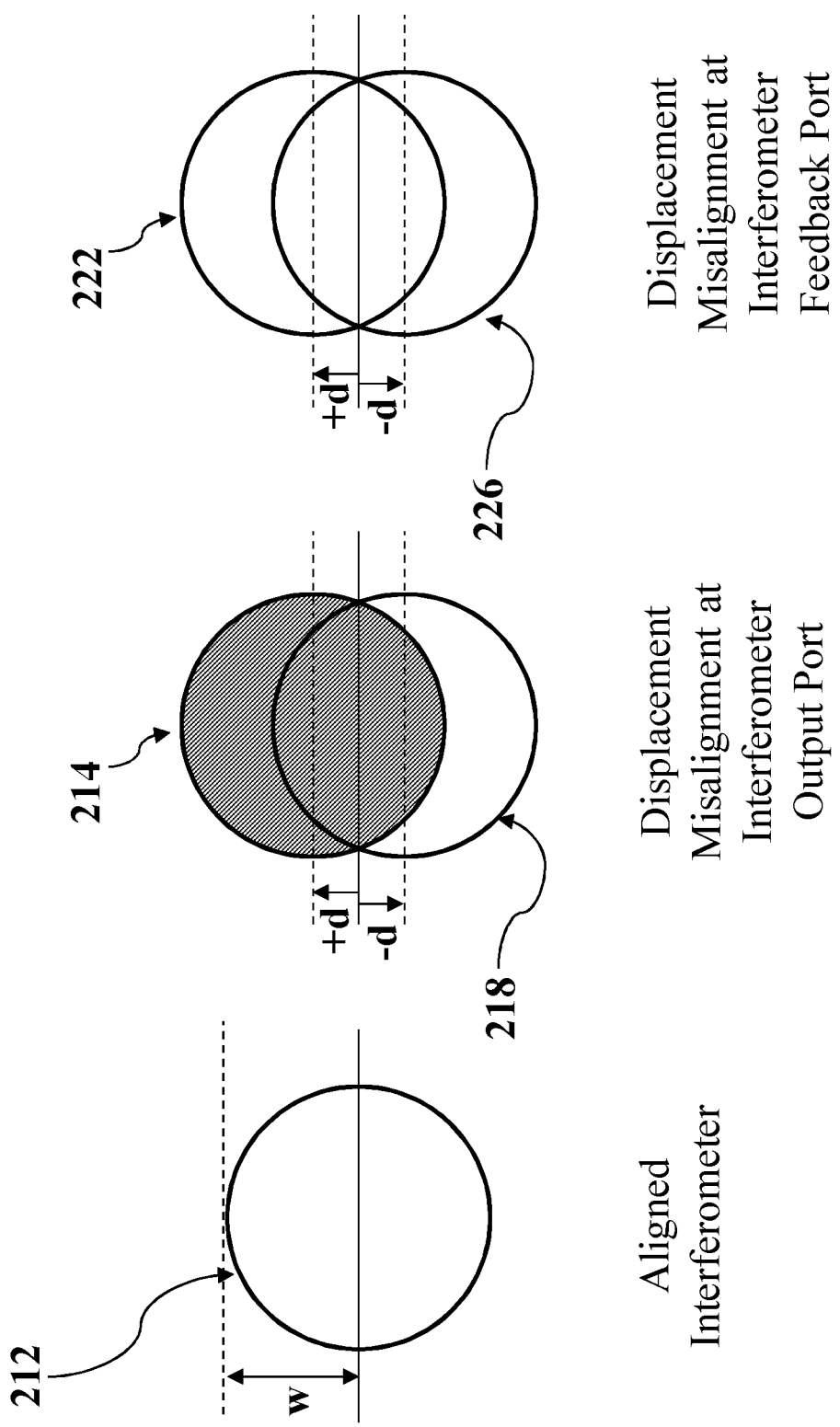
FIG. 3 is a diagram showing a displacement misalignment technique in respect of an interferometric device according to an embodiment of the invention.

FIG. 3 shows one possible misalignment methodology according to an embodiment of the invention, involving lateral displacement of the beams inside the interferometric device. An interferometric device, as in FIGS. 1 and 2, is considered in which an input mode 50 is split in amplitude into two substantially equal amplitude sub-beams, by way of example with a beamsplitter with 50% transmission and 50% reflection for the incoming light. The two sub-beams are directed to follow two paths and to be recombined again, by way of example by another beamsplitter that 50% transmits and 50% reflects the light. For purposes of illustration, the input mode is taken to be a Gaussian (TEM$_{00}$) mode 212 with a characteristic size w, where this size may for discussion purposes be based on the criteria when the field amplitude of the mode falls to 1/e of its peak central value. In the case of an aligned interferometer the two beam paths would be carefully aligned to bring the two beams back to the same position onto the recombining beamsplitter. However, for the misaligned interferometer of this embodiment of the invention, the beams in the two paths are instead purposefully displaced by equal amounts d in opposite directions compared to the aligned case such that these sub-beams recombine at the beamsplitter displaced by +d and −d offset from the aligned case. The methodology of this embodiment of the invention then teaches that the phase of the two recombining beams should be made to destructively interfere at the output port 41 such that these two sub-beams 214 and 218 subtract to provide the resultant output beam 51, and the two sub-beams constructively interfere at the feedback port 42 such that the two sub-beams 222 and 226 add to provide the resultant feedback beam 52. The Gaussian beam is taken in this example to be at or near its minimum waist position where its wavefront is substantially planar in the interferometer. The output beam 51 can be shown to be the spatial derivative of the input field for small displacement d compared to w. For an input Gaussian the resultant output beam 51 has the form of the higher-order Hermite-Gaussian mode $TEM_{01}$ and with a transmitted field amplitude proportional to ratio d/w. The higher-order index of the Hermite-Gaussian mode in this example will be in the plane of the displacement. The resultant feedback field 52 is predominantly the original spatial form of the Gaussian mode for small displacement d compared to w. It is seen in this example that the present displacement misalignment technique leads to a higher-order mode transformation of the laser output coupling but a feedback mode to the laser that is substantially the same as the input internal mode.

Figure 4:
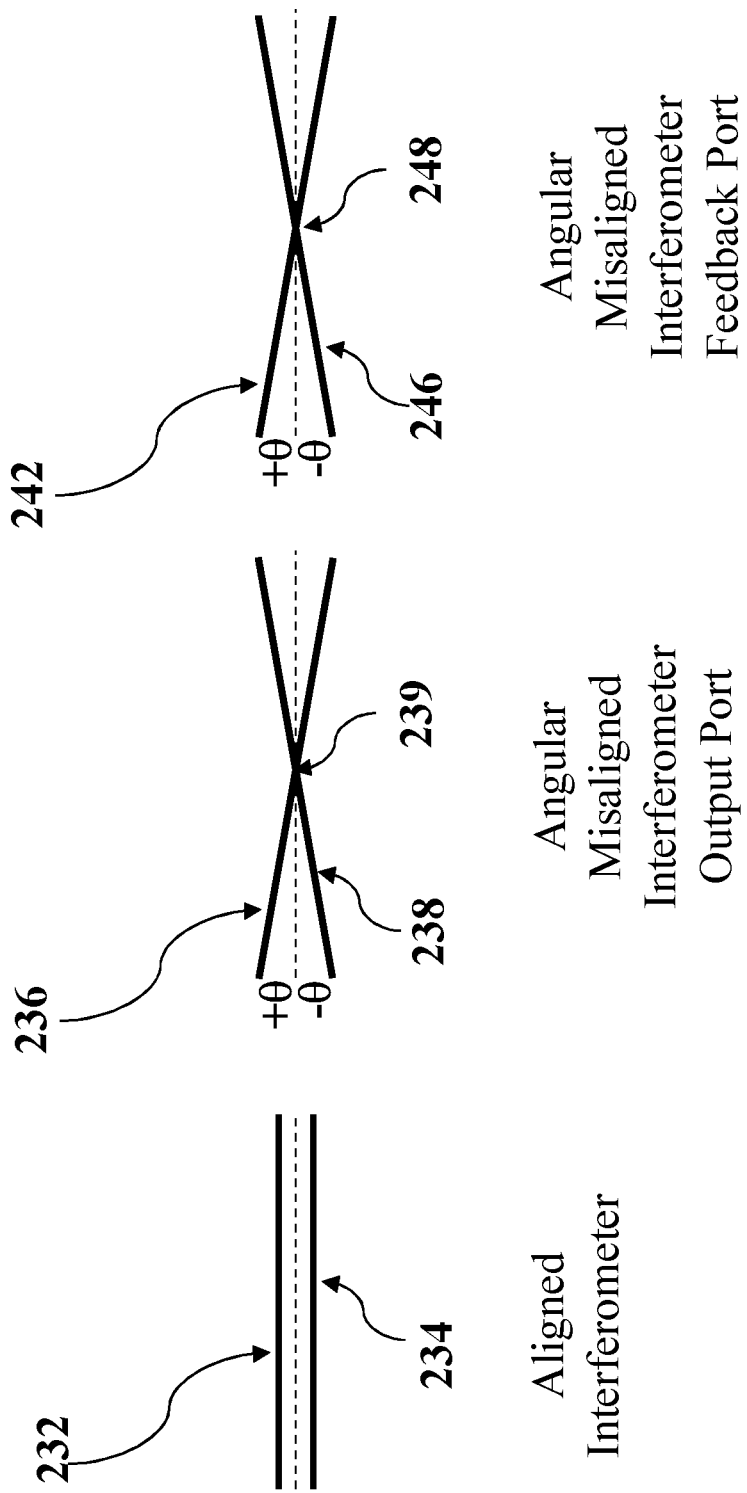
FIG. 4 is a diagram showing an angular misalignment technique in respect of an interferometric device according to an embodiment of the invention.

FIG. 4 shows a further possible misalignment methodology according to an embodiment of the invention, involving angular displacement of the beams inside the interferometric device. An interferometric device, as in FIGS. 1 and 2, is considered in which an input mode 50 is split in amplitude into two substantially equal amplitude sub-beams, by way of example with a beamsplitter with 50% transmission and 50% reflection for the incoming light. The two sub-beams are directed to follow two paths and to be recombined again, by way of example by another beamsplitter that 50% transmits and 50% reflects the light. The input mode is taken to be a Gaussian mode with a characteristic 1/e size w. In the case of an aligned interferometer the two beam paths would be carefully aligned to bring the two sub-beams back to the same position and to recombine into the same angle 232 and 234 at the recombining beamsplitter. However, for the misaligned interferometer of this embodiment of the invention, the beams in the two paths are deviated in angles by equal amounts θ in opposite directions compared to the aligned case such that they recombine displaced by +θ and −θ offset from the aligned case 232 and 234. The methodology of this embodiment of the invention then teaches that the phase of the central point of the two recombining beams should be made to destructively interfere at the output port 41 such that two sub-beams 236 and 238 subtract to provide the output beam 51, and constructively interfere at the feedback port 42 such that the two sub-beams 242 and 246 add to provide the resultant feedback beam 52. The exact destructive and constructive interference in the two ports can only occur at the one central location 239 for the output port 41 and the one central location 248 for the feedback port 42 due to the linearly changing relative phase caused by the angular asymmetry of the two beams. The output beam 51 can be approximated as the input field multiplied by a sinusoid in the direction of the angular displacement. The feedback beam 52 can be approximated as the input field multiplied by a cosinusoid in the direction of the angular displacement. For an input Gaussian and for small angular displacement θ compared to natural divergence angle for the Gaussian beam $\theta_G = \lambda/\pi w$ (and w is the minimum waist size of the Gaussian beam) the sine function will be approximately equal to the argument of the sine and its resultant output beam 51 can be shown to have the form of higher-order Hermite-Gaussian mode $TEM_{10}$ in the region near the beam central axis. The higher-order index of the Hermite-Gaussian mode, in this example, is in the plane of the angular displacement. The resultant feedback field is predominantly the original spatial form of the Gaussian mode for small angular displacement θ compared to natural divergence angle for the Gaussian beam with the cosine approximating to unity near the central region of the laser mode. It is seen in this example that displacement misaligned as described by this invention leads to a higher-order mode transformation of the laser output coupling and a feedback mode that is substantially the same as the input internal mode.

FIG. 5 shows a further possible misalignment methodology according to an embodiment of the invention, involving a combined displacement $\pm d_y$ in one dimension and angular displacement $\pm \theta_x$ in the orthogonal direction of the two sub-beams inside the interferometric device, and as separately described in FIGS. 3 and 4, respectively. As before the displacements and angular misalignments of the sub-beams should be substantially symmetric in in their offset compared to the aligned case. An interferometric device, as in FIGS. 1 and 2, splits an input mode 50 into two substantially equal amplitude sub-beams to follow two paths and to be recombined again, by way of example by a beamsplitter that 50% transmits and 50% reflects the light. The two sub-beams are made to destructively interfere at the output port 41 and constructively interfere at the feedback port 42, as previously described with regard to FIGS. 3 and 4. The output mode 51 can be shown to be a superposition of the $HG_{01}$ and $HG_{10}$ modes. In the plane with the angular displacement, however, the mode is π/2 out of phase with the mode in the other orthogonal plane. If the magnitude of these two orthogonal modes can be made equal than the output mode can be shown to be a vortex mode of the form of a Laguerre-Gaussian $LG_{01}$ mode, where mode indices are p=0 and l=1. The $LG_{01}$ mode has an annular (doughnut) amplitude profile with a spiral azimuthal phase undergoing 2π around the mode circumference, and possessing lh units of angular momentum per photon. The condition required to achieve the equality of the effect of the displacement and angular offset (the canonical condition) for a Gaussian mode is to set $d_y/w = \theta_x/\theta_G$ in the misalignment of the interferometric device. In this case the magnitude of the $HG_{01}$ and $HG_{10}$ modes will be equal, for small displacement and angular offset, and a perfect vortex $LG_{01}$ mode can be generated at the output port 41.

It will be noted that in this discussion the direction of $d_y$ and $\theta_x$ for a given beam was not stipulated. It can further be shown that the handedness of the vortex that describes the direction of the spiral phase rotation can be controlled in this invention by choosing the specific combination. For example, if one sub-beam has one combination (say, $+d_y$ and $+\theta_x$) and the other sub-beam has the other combination ($-d_y$ and $-\theta_x$) and gives rise to one handedness of vorticity, say $LG_{01}$, then a reversal of either one or other of $d_y$ and $\theta_x$ will give the other handedness of vorticity ($LG_{0,-1}$), for example, when one sub-beam has combination ($d_y$ and $-\theta_x$) and the other sub-beam has combination ($-d_y$ and $+\theta_x$).

It is further noted that the internal mode may not just be a Gaussian mode but may be a higher-order mode such as a Laguerre-Gaussian mode $LG_{pl}$ where p is the radial index and l is the azimuthal index and corresponding to a mode having vorticity with topological charge l. The internal mode in the more general case will be a superposition of such modes. The condition required to achieve the equality of action of the displacement and angular offset is the canonical condition as for the Gaussian mode to set $d_y/w=\theta_x/\theta_G$ in the misalignment of the interferometric device, where w and $\theta_G$ are the radial waist size and angular divergence of the underlying Gaussian of the Laguerre-Gaussian mode rather than the waist size and divergence of the Laguerre-Gaussian mode.

Figure 6:
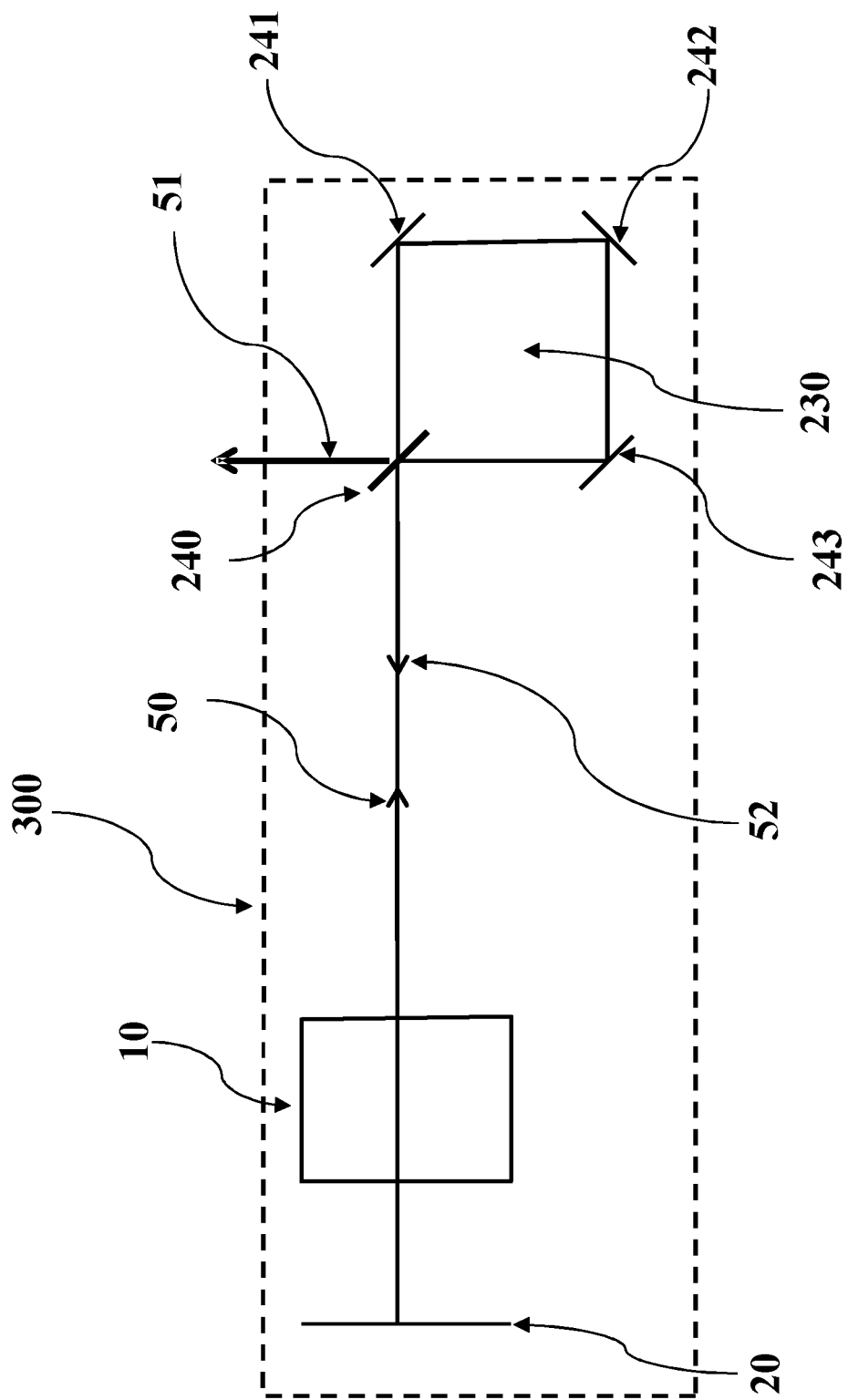
FIG. 6 is a diagram of a preferred embodiment of the invention with a misaligned Sagnac interferometer incorporated as part of a laser system.

FIG. 6 shows a schematic diagram of a preferred embodiment of the present invention in the form of FIG. 1. It uses a misaligned Sagnac interferometer and incorporates the misalignment methodologies described in FIGS. 3 and/or 4 and/or 5. A laser system 300 contains a gain medium 10 and incorporates an interferometric device 230. The interferometric device 230 in this embodiment has the form of a Sagnac interferometer composed of a beamsplitter 240 and three mirrors 241, 242 and 243, by way of example, to form a loop path. The laser cavity of the laser system 300 is formed between a back reflector 20 and the Sagnac interferometric device 230 to form laser oscillation with laser mode propagating in the forwards direction 50 and backwards direction 52. The Sagnac interferometric device has three ports (input, output and feedback) all collocated at the beamsplitter but the direction of the input beam 50, output beam 51 and feedback beam 52 are all separate and distinguishable. The beamsplitter 240 takes the input beam 50 and splits it into two sub-beams that are substantially equal in amplitude by designing beamsplitter 240 to be, ideally, with 50% reflectivity and 50% transmission. The beamsplitter is aligned to send the sub-beams via the three mirrors 241, 242 and 243 to return the two sub-beams back to the beamsplitter 240 following opposite loop directions (clockwise and anti-clockwise) where they interfere to produce an output beam 51 and a feedback return beam 52 to the laser cavity. The two beams in this embodiment will follow substantially similar paths (albeit in opposite directions) accumulating the same propagation phase difference. The output beam 51 is formed by the interference of one sub-beam transmitted twice and one sub-beam reflected twice by the beamsplitter and this provides a π phase shift or destructive interference between the two sub-beams, due to the nature of a lossless beamsplitter, known to those skilled in the art. The feedback return beam 52 is formed by sub-beams that both see one reflection and one transmission at the beamsplitter and combine with constructive interference. It is further noted that it is known by those skilled in the art that for a stable laser cavity the laser mode has wavefront curvatures matched to end mirrors and for plane mirrors these are plane wavefronts and correspond to the minimum waist size location of the Gaussian mode. This property ensures that the input mode is automatically plane wavefront at the interferometer, which is beneficial to achieve the correct interference for the present misalignment method. For the aligned case, with a 50% beamsplitter, the output field 51 can be zero and the feedback field 52 is equal to the input field if no losses are incurred in the Sagnac loop elements 240, 241, 242 and 243. By misalignment of the Sagnac interferometer in the manner of this invention, as described in FIGS. 3, 4 and 5, the output can be a higher order mode formation or vortex mode for the case of a Gaussian cavity mode. The displacement misalignment of the two sub-beams can be created by equal and opposite angular deflection of the two mirrors 241 and 243 in the out-of-plane direction of this diagram. The angular misalignment of the two sub-beams can be created by angular rotation of mirror 242 in the in-plane direction of the diagram.

FIG. 7 is a diagram of experimental features of a system to demonstrate the operation of an embodiment of the invention and to validate some of its advances. The demonstration system FIG. 7a is a laser in the form of the embodiment of FIG. 6 and incorporating a Sagnac interferometer 230 with deliberate misalignment in the manner of this invention as further detailed in FIG. 7b. The laser gain medium 10 was a Nd:YVO$_4$ laser crystal with 2 mm×2 mm cross-section and 4 mm length and 0.5 at. % Nd doping. The laser cavity was formed between a back mirror BM (20) and a Sagnac interferometer 230 composed of a 50% beamsplitter BS (240) and three mirrors M1 (241), M2 (242) and M3 (243). A lens with focal length of 75 mm was placed in the cavity to provide the control of the spatial mode size at the gain medium crystal to ensure operation on an internal Gaussian TEM$_{00}$ laser mode. A turning mirror TM was also incorporated to allow easy access of an optical pump beam but is not a necessary feature of this invention. The pump beam was a laser at 808 nm to provide end-pumped excitation and produce population inversion in the laser gain medium and allow lasing at the wavelength 1064 nm in Nd:YVO$_4$. To compare results to a conventional laser operation a removable turning mirror (removable TM) and a standard partially reflecting mirror output coupler OC could be inserted (but these items are removed for the laser cavity operation in the manner of this invention with the Sagnac interferometer 230). The cavity length of the conventional laser was matched so the distance from removable TM to the output coupler OC was the same as distance to the mirror M2 in the Sagnac interferometer cavity, thereby giving a fair comparison of the two cavities.

The misalignment method for the Sagnac laser cavity is shown in further detail in FIG. 7b following the presently-taught methods for displacement and angular offset. The displacement offset was in the vertical (out-of-plane) dimension and the angular offset in the horizontal (in-plane) dimension. The displacement misalignment could have been achieved as described in FIG. 6 by equal and opposite vertical deflection of the two mirrors M1 (241) and M3 (243). In this experimental system an alternative method was employed to more simply achieve the same effect using an anti-reflection-coated (AR) plate that was inserted into the Sagnac loop. This was a parallel plate of BK7 glass of thickness t and refractive index n and by angling in the vertical by angle ψ the beam path is displaced by a distance d due to the refraction in the angled glass plate. This displacement is in opposite directions for the two sub-beams entering the angled AR plate from opposite sides as shown in FIG. 7b. For small angles, the distance $d \approx t(1-1/n)\psi$. The automatic symmetric opposite displacements of this method are an added advantage of this method over using the pair of mirrors M1 and M3 that need to be carefully manually matched for each displacement required. The angular offset was produced by horizontal (in-plane) rotation of mirror M2 (242) by angle θ/2 and, by doubling of this angle of a beam reflected by the mirror, an equal and opposite angular displacement θ was imposed on the two counter-propagating sub-beams as shown in FIG. 7b. By performing one or both of these misalignments a mode transformed output 51 was produced. For only a displacement or an angular misalignment a TEM$_{01}$ or TEM$_{10}$ mode transformed beam, respectively, was output coupled from the Sagnac interferometer output port of beamsplitter 240. When both misalignments were employed together, with the correct matching of the displacement and angle offset for the canonical condition, a vortex LG$_{01}$ mode was emitted. In all cases a Gaussian TEM$_{00}$ mode was observed to be oscillating in the laser cavity. The system showed a key advance provided by the present work, that a misaligned interferometer in the laser system can create a mode transformed output whilst preserving the internal laser mode.

FIG. 8 shows some further details of results produced by the laser system of FIG. 7 and validation of some of the advances provided by the present work. FIG. 8a shows spatial quality results of the internal cavity mode (observed by leakage transmission from back cavity mirror BM (20)), mode transformed vortex output, and an interferogram of the vortex beam with a plane wave to display the spiral phase structure of the output vortex. The two cases of left-handed (top row of images) and right-handed vortex (bottom row of images) was produced by changing the angle of the parallel plate in the Sagnac interferometer from a positive to a negative angle to switch the relative sign of sub-beam displacement while keeping its magnitude the same, and with a fixed angular misalignment. For the left-handed vortex, verified by the spiralling phase interferogram, the cavity mode had an beam propagation parameter of of $M_x^2=1.28$ and $M_y^2=1.26$ in the in-plane and out-of-plane directions, respectively, which is close to the expected perfect Gaussian parameter of $M^2=1.0$. For the vortex beam, its beam quality $M_x^2=2.09$ and $M_y^2=2.07$ is close to the expected $LG_{01}$ parameter of $M^2=2.0$, which together with the high quality spiral interferogram confirms the vortex generation. Similar results are achieved for the other handed vortex as shown in bottom row of FIG. 8a showing the simplicity and efficacy of the selection of the vortex and its handedness.

Theoretically, the output vortex can be a perfect $LG_{01}$ mode by mode conversion of the internal Gaussian mode for very small d/w. Our theory and experimental results show that the vortex spatial quality is close to ideal $LG_{01}$ up to d/w=0.5 where d is the displacement and w is the radius of the Gaussian beam where its field values falls to 1/e of its axial peak value. This ratio of d/w corresponds to an output coupling transmission of about 30%.

FIG. 8b has further results showing the output power as a function of pump power of the laser system of FIG. 7 with misaligned interferometer to mode transform the laser to a vortex mode (vortex OC). For comparison the corresponding power output for the conventional laser cavity with standard mirror output coupler (OC) and addition turning mirror (removable TM) is also shown on the same graph. For fairness of comparison the output coupling of both interferometer vortex OC and standard OC was 16%. The standard laser with Gaussian $TEM_{00}$ output had a laser slope efficiency (gradient of power curve) of 28% and for the vortex output of this invention the laser slope efficiency was 25%. The result shows that the efficiency of the laser is only minimally decreased (~10%) with the insertion of the misaligned Sagnac interferometer compared to the conventional laser and this may be further improved with better optics than used in this demonstration system. This maintenance of high efficiency validates one key beneficial advantages of the use of low insertion loss elements of the apparatus of the present work, for commercial vortex generation in laser systems.

For mode transformed output with a high quality vortex mode the theory underlying our method requires good matching of the relative misalignments to achieve the canonical condition in the two orthogonal directions, which for a Gaussian mode is to set $d_y/w=\theta_x/\theta_G$ in the displacement and angular misalignment of the interferometric device. In principle, this can be calculated from the known laser mode waist size w at the interferometer. In practice, the setting of this condition can be achieved experimentally without calculation by observing and optimising of the output mode quality of the transformed vortex beam. This can be done, by way of example, as in our experiments, by measuring beam quality parameter $M^2$ in both in-plane and out-of-plane directions and also observing the quality of the spiral interferogram, and optimising them to the theoretical expectation. This can be done, for example, by angle adjustment of mirror M2 (242) to get the best angular offset θ for a given displacement misalignment setting d.

It is also noted that our method allows arbitrary and continuous variation of the output coupling transmission of the laser by varying the displacement d (and correspondingly θ). This is a further advantage of our invention methodology as transmission variation can be used to maximise output power and efficiency of the laser, a control that is not normally available by using a fixed reflectivity output mirror in a standard laser.

FIG. 9 is a diagram of other mode transformed outputs that can be produced when the internal laser mode is itself a vortex mode and depending on the vorticity direction of the misaligned interferometer compared to that of the internal mode. When the combined displacement misalignment and angular offset is used as in the Sagnac interferometer of the laser system described in FIGS. 6 and 7, the method of this invention is validated in the results of FIG. 8 that a Gaussian internal laser mode can be transformed to a $LG_{01}$ or $LG_{0,-1}$ vortex mode where the handedness of vorticity can be readily controlled by the relative direction of displacement and angular offset for each sub-beam in the interferometer, as described previously. If, however, the internal laser mode is itself a vortex the methods of this invention still apply and the misaligned interferometer will mode transform the internal mode at the output port but substantially preserve the form of the internal laser mode. Mathematical analysis shows that when an $LG_{01}$ vortex is the internal mode of the laser then with the same misalignment methodology as before the output port will be mode transformed with vorticity of the output mode increased or decreased depending on the relative vorticity setting of the interferometer compared to the vorticity of the input laser mode. Fuller analysis shows that for interferometer misalignment vorticity in the same sense as internal laser mode $LG_{01}$ the transformed output is a coherent superposition of a $LG_{02}$ and $LG_{00}$ mode; when in the opposite sense the transformed output is a $LG_{10}$ mode with a single radial node and zero vorticity. For interferometer misalignment vorticity in the same sense as internal laser mode $LG_{02}$ the transformed output is a coherent superposition of a $LG_{03}$ and $LG_{01}$ mode; when in the opposite sense the transformed output is a $LG_{11}$ mode with a single radial node and topological charge of vorticity reduced from 2 to 1. These examples are summarised in the table of FIG. 9. For a more general laser vortex mode $LG_{01}$ with vortex topological charge l, then the transformed output, with interferometer misalignment vorticity in the same sense, is a coherent superposition of a $LG_{0,l+1}$ and $LG_{0,l-1}$ mode; when the interferometer misalignment vorticity is in the opposite sense the transformed output is a $LG_{1,l-1}$ mode with a single radial node and topological vorticity charge reduce by one to l-1. It is noted that the methods of the present work lead then to a plethora of higher order vortex generation and coherent mode superposition that can have further application and benefits beyond the first-order $LG_{01}$ mode.

For the above higher order mode transformed output to have a high quality the theory underlying our method requires good matching of the relative misalignments to achieve the same canonical condition in the two orthogonal direction as for a Gaussian internal mode where $d_x/w=\theta_x/\theta_G$ in the displacement and angular misalignment of the interferometric device and where the waist size w and beam divergence angle $\theta_G$ are those of the underlying Gaussian beam of the internal higher-order Laguerre-Gaussian mode rather than of the internal mode itself.

The embodiment of this invention with a misaligned Sagnac interferometer is a preferred embodiment as the destructive and constructive interference conditions of this invention can be achieved automatically by the common-path nature of the Sagnac interferometer. However, other embodiments can still have benefit and can offer other advantages when not using a common-path interferometer, as described in relation to some of the following figures.

Figure 10:
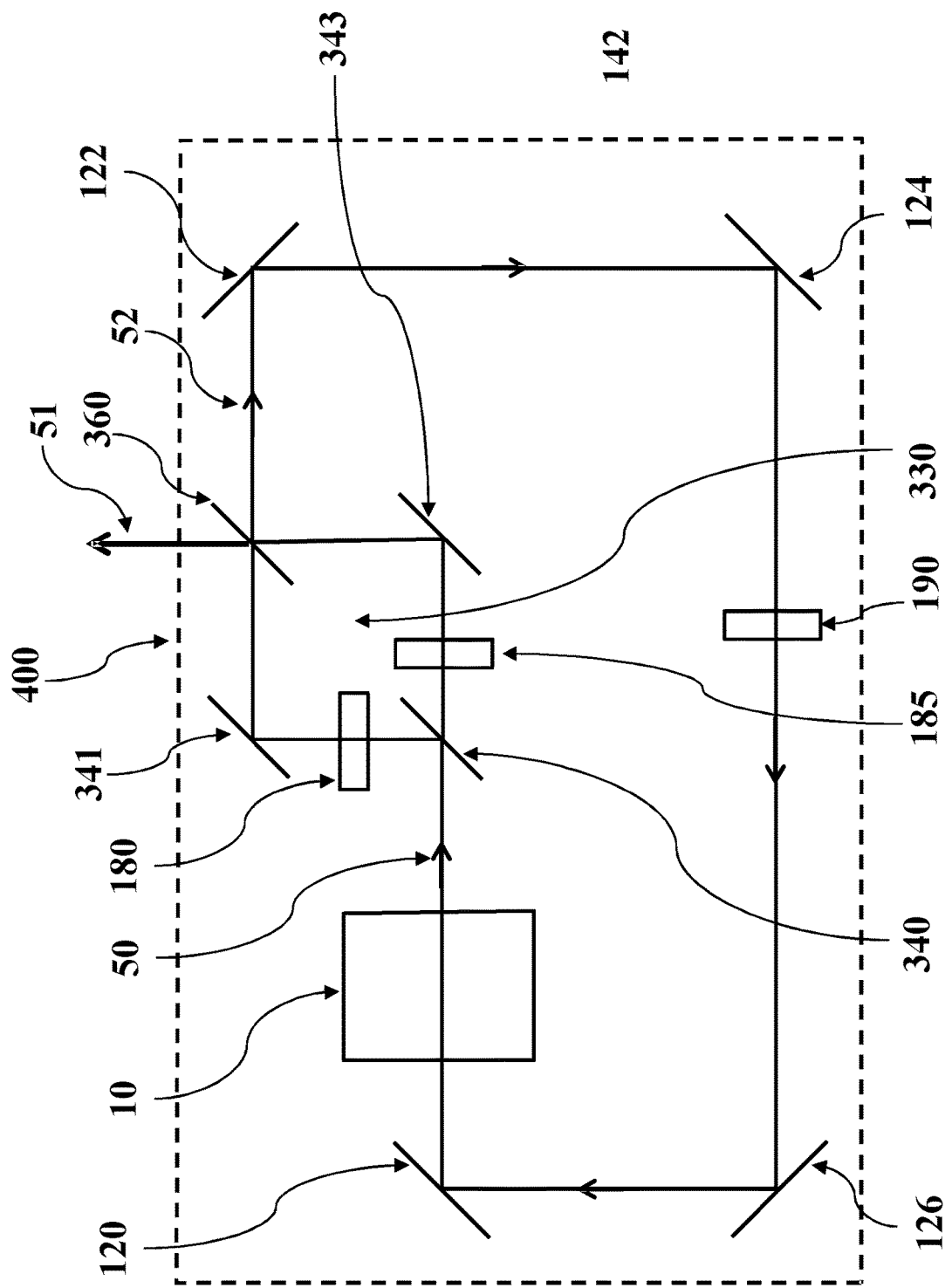
FIG. 10 is a diagram of a further embodiment of the invention with a misaligned Mach-Zehnder interferometer incorporated as part of a laser system.

FIG. 10 is a diagram of a further embodiment of this invention with a misaligned Mach-Zehnder interferometer incorporated as part of a laser system in the form of FIG. 2 and incorporating the misalignment methodologies described in FIGS. 3 and/or 4 and/or 5. A laser system 400 has a gain medium 10 and incorporates an integrated interferometric device 330. The interferometric device 330 in this embodiment has the form of a Mach-Zehnder interferometer composed of a first beamsplitter 340 and two mirrors 341 and 343, and a second beamsplitter 360. The laser cavity of laser system 400, in this particular embodiment, is a ring laser cavity formed, by way of example, by four mirrors 120, 122, 124 and 126 but any combination of mirrors or other beam deflecting optics could be used that complete a closed path. In this cavity the closed path is also completed by laser mode propagating through the interferometer. The forwards direction laser mode 50 is input at first beamsplitter 340 and the two split sub-beams traveling via mirrors 341 and 343, have their paths directed to recombine at second beamsplitter 360 and form a feedback output 52 to complete the laser cavity path. The two beams also when combining at beamsplitter 360 create a mode transformed output 51. Beamsplitters 340 and 360 are chosen to be substantially with 50% reflectivity and 50% transmission. For the aligned case, the two sub-beams would be collocated and collinear at the beamsplitter 360, and the feedback beam 52 and output mode 51 both spatially the same as the internal laser mode with their relative strength depending on the relative phase of the two sub-beams. By misalignment of the Sagnac interferometer in the manner of this invention, as described in FIGS. 3, 4 and 5, then output mode 51 can be a higher order mode formation or vortex mode for the case of a Gaussian input cavity mode, and feedback mode substantially the same as the internal mode if, in accordance with the method of this invention, the destructive and constructive conditions are met at the output direction 51 and feedback direction 52, respectively. By way of example, we describe particular strategies for the displacement and angular misalignments, but others could be devised. For the lateral displacement, two glass plates 180 and 185 can be used to provide a symmetric displacement in opposite directions of the two sub-beams by rotating the plates in opposite relative senses to cause one sub-beam to go up (out of plane dimension, say) and the other sub-beam down by equal but opposite amount. The two mirrors 341 and 343 can be rotated in the in-plane dimension in opposite senses to provide symmetric angular offset of the two sub-beams in the plane orthogonal to the displacement misalignment.

There is a further consideration to be made in this case because as the two sub-beams follow separate paths there is no automatic ability to achieve the required phase condition as was the case with the Sagnac interferometer. For this interferometer, our invention can still be operated by adjusting the two sub-beam paths so that their relative path lengths taken achieve the destructive and constructive phase condition for a given laser wavelength at the output 51 and feedback 52, respectively. A plane wavefront can be substantially created at the interferometer, by way of example, by addition of a suitable cavity optic such as a lens 190 whose location and focal length is appropriately chosen using standard laser cavity design analysis.

It is further considered that the laser cavity and sub-cavity elements may experience temperature or mechanical perturbations that will tend to prevent the ideal required phase condition requirements being maintained at beamsplitter 360, and will cause loss of quality of mode transformation at the output 51 and also spatial disruption to the internal laser mode and then defeat the methodology of this invention. Two solutions are noted. One is a passive solution in that the laser has the natural ability to choose a different laser frequency if the phase condition changes for the original set frequency, and this condition also provides high spectral selective of the cavity in the manner when using aligned interferometric devices in lasers. However, perturbations and hence frequency changes may frequently and chaotically. The second and more active approach would be to provide an active control by providing piezoelectric adjustment of one of the cavity optics, such as one of the interferometer mirrors 341 or 343, or one of the external ring cavity mirrors, say 122. Feedback control of this optic can adjust path length to actively compensate cavity perturbation and maintain the same frequency and phase condition. The feedback for this adjustment could be achieved by monitoring and maximising the power of the laser or a spatial monitor to maintain the mode form, but other feedback signals could also be considered to achieve this purpose.

Figure 11:
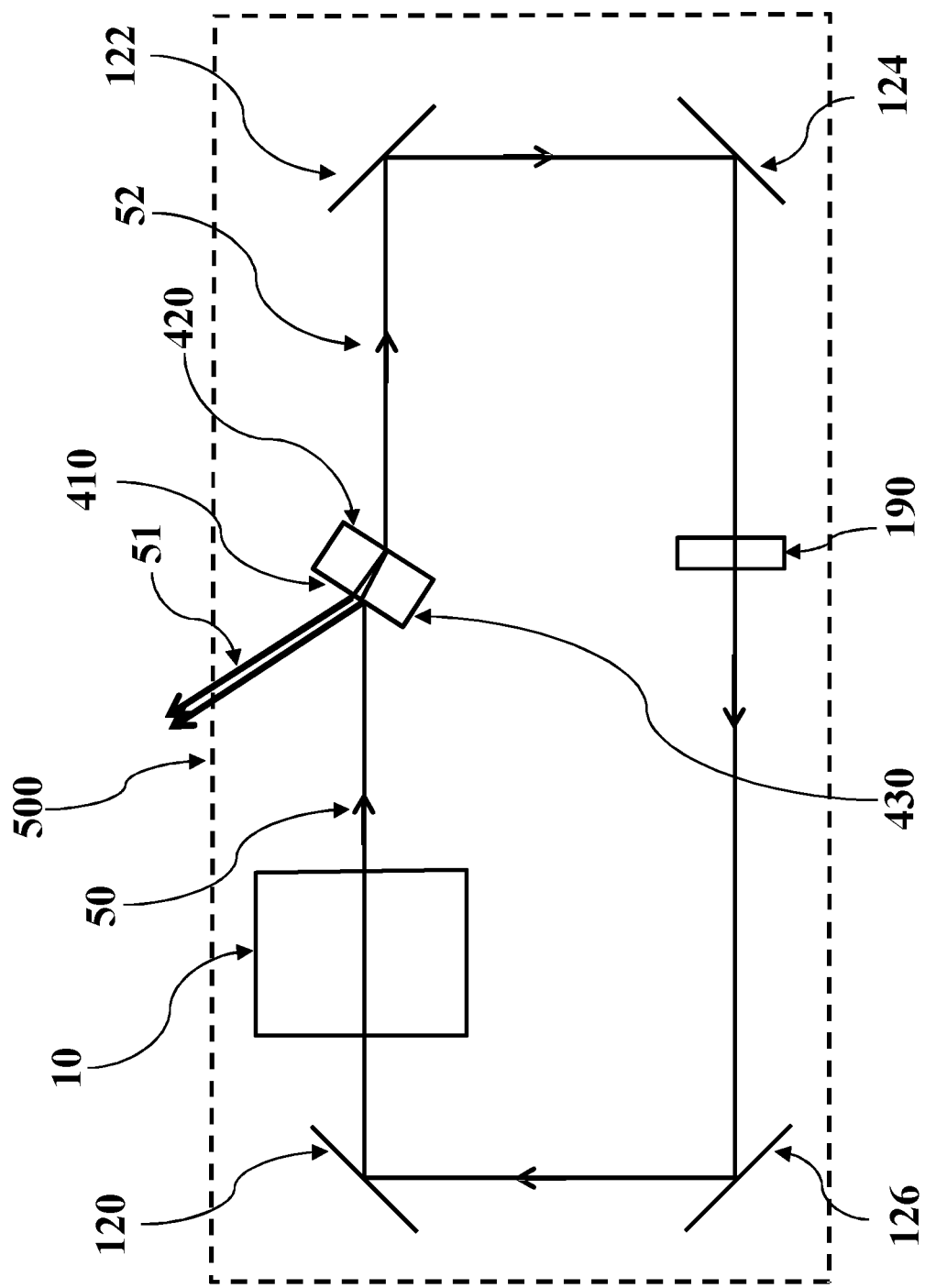
FIG. 11 is a diagram of a further embodiment of the invention with a misaligned Fabry-Perot etalon interferometer incorporated as part of a laser system.

FIG. 11 is a diagram of a further embodiment of this invention with a misaligned Fabry-Perot etalon interferometer incorporated as part of a laser system in the form of FIG. 2 and incorporating the misalignment methodologies described in FIGS. 3 and/or 4 and/or 5. A laser system 500 contains a gain medium 10 and incorporates an integrated interferometric device 430. The interferometric device 430 in this embodiment has the form of a Fabry-Perot interferometer composed of a first partially reflective surface 410 and a second partially reflective surface 420. The two surfaces could be the two surfaces of a solid glass plate or two independent mirror surfaces. The laser cavity of laser system 500, in this particular form of this embodiment, is a ring laser cavity formed, by way of example, by four mirrors 120, 122, 124 and 126 to form a closed path completed also by laser mode propagating in the forwards direction 50 through interferometric element 430 with a feedback output 52. There will also be an output beam 51 due to the superimposed and misaligned reflection from the two surfaces 410 and 420. If the two reflections are able to be configured with misalignment according to the methodology of this invention, then this output can be mode transformed and the feedback beam 52 be substantially in the form of the internal mode, as in the previous embodiments. In this system, consider the case with two reflectors on either side of a solid glass plate. The displacement misalignment can be achieved by tilting the plate. The displacement can be well controlled by tilting the plate since due to refraction at the input face 410 the return beam from the second surface reflection is displaced from the first surface by an amount dependent on the plate thickness and angle of tilt of the plate. If these two surfaces are parallel in this tilt direction, then the two emergent reflections will be parallel. The angular adjustment in the orthogonal plane can be achieved either by angular adjustment if the two surfaces are on separate mirrors or if using a solid glass plate by fabricating a wedge angle between these faces in the orthogonal plane. If the displacement is chosen to match the angular offset to achieve the canonical condition than a vortex will be generated with the correct phasing of the interfering beams.

The correct phase for destructive interference at the output surface 410 can be achieved by having the appropriate path length difference between the two beams recombining at surface 410. This can be done by fine adjustment of tilt or alternatively by temperature control of plate 430 using the temperature dependence of the refractive index to control the phase condition. As with the Mach-Zehnder case of FIG. 10 a plane wavefront of the laser mode at the interferometer can be achieved with correct cavity design, by way of example, using an intracavity lens 190. Additionally, control against environmental perturbation of the laser cavity can be achieved, by way of example, with piezoelectric control of a cavity mirror, as described in the Mach-Zehnder embodiment of FIG. 10.

It must be considered in this embodiment that there is more than just a single reflection between the two surfaces 410 and 420 and also the choice of the reflectivity of the two surfaces must be further considered. If the case of a small reflectivity is considered, then further multiple reflections will be substantially negligible in the output 51 as they will be lower than the first reflection by the product of the two further weak reflections (one at the first surface 410 and then at the second surface 420). If the first surface reflection is weak then having the same reflectivity at the second surface will return a similar amplitude of beam to the first surface and substantially be able to achieve the ideal destructive interference condition of equal sub-beams. However, the reflectivity of the second surface 420 can be designed to have a larger reflectivity than the first surface 410 to arbitrarily well equalise the two interfering sub-beams.

FIG. 12 is a diagram of further elaborations of embodiments of the invention.

FIG. 12a considers the case of FIG. 2 (or in the manner of the embodiments in FIG. 10 and FIG. 11) where the cavity is not a ring but a linear cavity with gain medium 10 and two mirrors 20 and 20' and misaligned interferometric device (130) is internally placed between these two mirrors. In this embodiment the misaligned interferometric device has input from both directions in the cavity 50 and 50'. The methodology of this invention still applies in this case but instead of a single mode transformed output there will be two mode transformed outputs in opposite directions 51 and 51'. For example, in the embodiment of FIG. 10 with a Mach-Zehnder interferometer, the first output 51 from the second beamsplitter would be as described previously resulting from the forward input mode. For the linear cavity, a backward input mode would enter the second beamsplitter and a second output mode 51' would result at the first beamsplitter, as would be seen by reversing the direction of the cavity path arrows in FIG. 10. Outputs 51 and 51' would both be mode transformed by considering the reciprocity condition of light.

FIG. 12b considers the case of FIG. 1 or its embodiment in FIG. 6 with the Sagnac interferometer. In this further embodiment gain medium 10 is placed between two misaligned Sagnac interferometers and there is no cavity mirror. In this further embodiment there is the misaligned Sagnac interferometer 30 (as was described in FIG. 6) but the plane cavity mirror is replaced by a second misaligned Sagnac interferometer 30'. It should be clear that there will be two outputs from each of the misaligned interferometers, whilst each interferometer following the teaching of this invention, is still maintaining a substantially unchanged laser mode, such as a Gaussian mode. It will be noted that the two interferometers can be set to provide outputs with opposite handed vorticity. Since these are derived from the same laser they will be coherent and this allows new opportunities for applications where such beams can interact or where these beams can be coherently combined to create new spatial formats. By way example, if the two beams are given orthogonal polarisations then they could be superposed to produce resultant radially or azimuthally polarised output beams if correctly phased.

Figure 13:
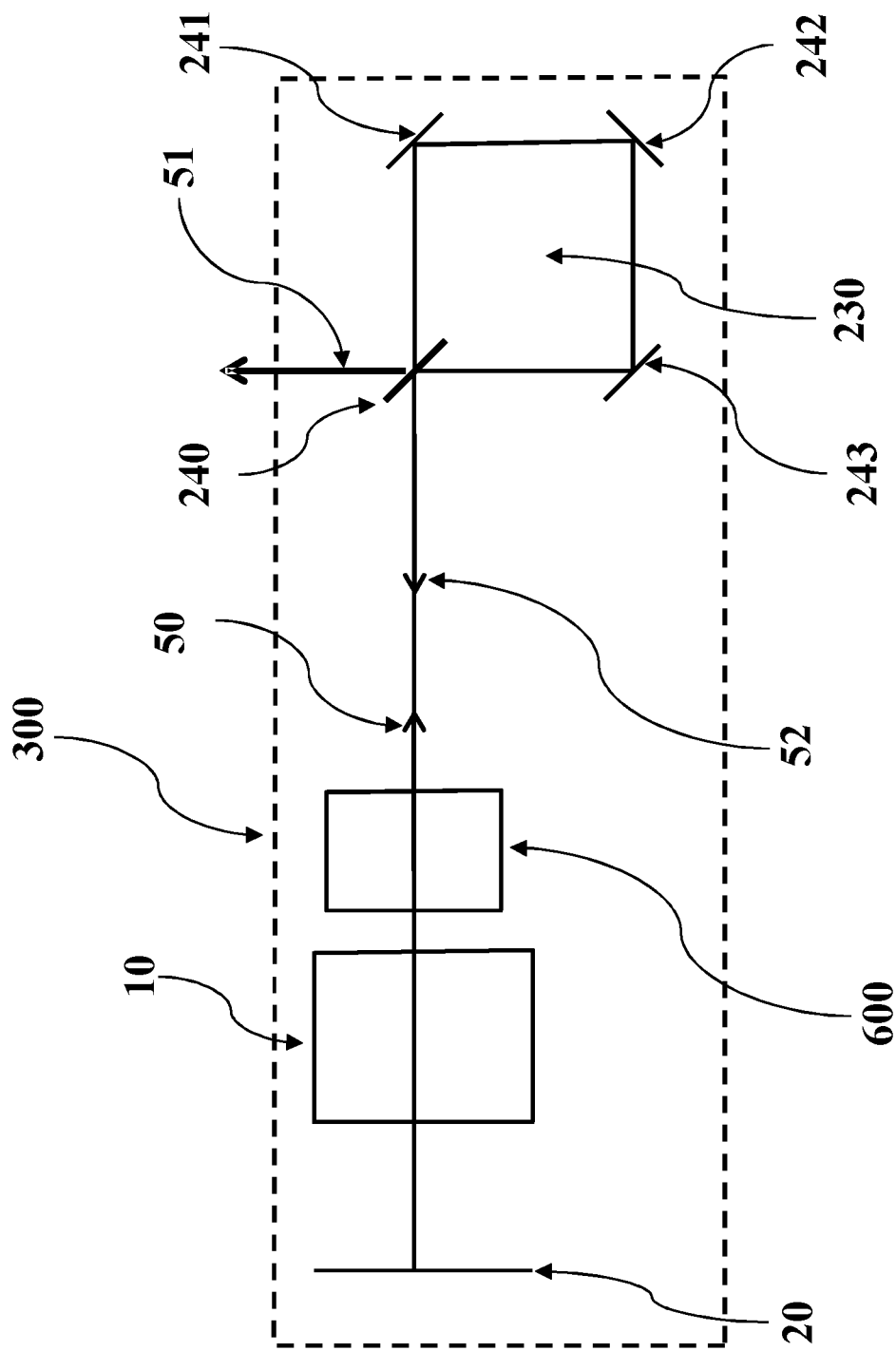
FIG. 13 is a diagram denoting the operation of further embodiments of the invention with the addition of other elements incorporated into the laser for pulsed operation or wavelength tuning.

FIG. 13 is a diagram denoting the operation of further embodiments of the invention with the addition of other element(s) 600 incorporated into the laser cavity. The other numbered components in diagram of FIG. 13 are as previously described in FIG. 6. The spatial configuration is as previously defined with a mode transformed output, by applying the methods of this invention, but by adding further element for Q-switching, as one example, pulsed operation can simultaneously be achieved in the output mode. This leads to mode transformation and to output pulses with high peak powers. Similarly, element 600 can be a device to create other pulsed format e.g. for modelocking to produce ultrashort pulses with picosecond of femtosecond duration. In the modelocking case, with the right cavity design and dispersion compensation, nonlinearity in the gain element itself can provide the mechanism for the modelocking. Other intracavity element(s) 600 could include wavelength tuning element(s). This would be beneficial to provide a tunable wavelength of the mode transformed output of this invention. This wavelength tuning might also be done in combination with pulsed operation of the laser.

It will be clear to those skilled in the art that the several embodiments presented here are not exhaustive. For example, a Michelson interferometer could be incorporated as the misaligned interferometric device in the laser, and if the two recombining beams can be made to be displaced or angularly misaligned in the manner taught by this invention then mode transformed output can be achieved without substantial disruption of the internal laser mode.

There are also other misalignments of the interferometric device that are not displacement or angular offsets that could also be performed and, following the teaching of this invention, can also produce mode transformed output without substantial disruption to the internal laser mode. These other spatially transformed output beams could also provide beams with other benefits. By way of example, when the two sub-beams recombine at the output port of the interferometer a wavefront mismatch can be achieved by placing a lens (or lenses) in the interferometric device and by misaligning a lens (or lenses) from a symmetric positioning. This will create different wavefront curvatures of the two sub-beams when they recombine at the beamsplitter, and by making the two beams constructively interfere at the beam centre in the feedback port and destructively interfere in the output port, the laser internal mode can be substantially preserved for a weak difference in curvatures whilst there will be a mode transformed output due to the imbalance of the two sub-beams.

The methods of embodiments of this invention prescribe the misaligned interferometric device should be operated to provide the conditions for destructive interference at the output port and constructive interference at the feedback port to the laser and the sub-beams recombining should be equal in magnitude. However, it would be expected that even if these conditions are substantially, but not exactly perfectly, achieved that the benefit of this invention can still be obtained.

The figures illustrating the present embodiments only show a gain medium for simplicity of explanation but other cavity elements such as a lens or curved mirrors may be included in the laser cavity for spatial mode size control and adjustment for good Gaussian mode operation, by way of example, and still operate with the methods of this invention. The gain medium itself could be any of a number of media that are well known to those in the field including: a solid-state gain medium; a diode-pumped solid-state gain medium; a fibre laser amplifier gain medium; a gas laser gain medium; and a liquid laser gain medium.

Specific laser cavity elements have been mentioned as examples, but other can be substituted and still achieve the same effect. For example, the beamsplitter in the interferometric device could be a partially reflecting dielectrically coated or metal coated mirror, but it could also be any other device that can split a beam into two parts, preferably with minimal loss, such as a diffractive optical element or by using frustrated total internal reflection at an interface between two closely spaced dielectric surfaces, by way of example. Similarly, the mirrors of the interferometric device could be replaced by any fully reflecting element (or combination of elements) such as total internal reflection at an interface at a facet of a prism, by way of example.

Aspects and features of the present disclosure are set out in the following numbered clauses:

1. A method for generating a spatial transformation of the output from a laser system, the method comprising:
   disposing a laser gain medium within a laser cavity structure;
   arranging an interferometric device to complete the laser cavity structure, wherein the interferometric device receives an input beam from laser oscillation in the laser cavity structure, splits the input beam into two sub-beams, and recombines the two sub-beams to provide a feedback beam to sustain laser oscillation;
   configuring components of the interferometric device to provide relative misalignment of the two sub-beams that are produced internally to the interferometric device;
   using at least a first output port of the interferometric device to provide an output beam of the laser system that due to the misalignment is a spatial transformation of the internal mode structure of the laser; and using at least a second output port of the interferometric device to provide the
   feedback beam to the laser cavity structure that sustains laser oscillation with a spatial structure that substantially preserves the internal mode structure of the laser.

2. The method of clause 1, wherein the two sub-beams destructively interfere at the first output port of the interferometric device.

3. The method of clause 1 or clause 2, wherein the two sub-beams constructively interfere at the second output port of the interferometric device.

4. The method of any preceding clause, wherein the misalignment of the components in the interferometric device causes a lateral displacement of the two sub-beams in one plane of the interferometer.

5. The method of any of clauses 1 to 3, wherein the misalignment of the components in the interferometric device causes an angular offset of the two sub-beams in one plane of the interferometer.

6. The method of any of clauses 1 to 3, wherein the misalignment of the components in the interferometric device causes a lateral displacement of the two sub-beams in one plane and an angular offset of the two sub-beams in an orthogonal plane of the interferometer.

7. The method of any of clauses 1 to 3, wherein the two sub-beams are substantially equal in amplitude.

8. The method of clause 4, wherein the misalignment of the components in the interferometric device causes a symmetric lateral displacement of each of the two sub-beams in one plane of the interferometer that is less than half the beam field waist radial size when the internal laser mode is a Gaussian beam.

9. The method of clause 5, wherein the misalignment of the components in the interferometric device causes a symmetric angular offset of each of the two sub-beams in one plane of the interferometer that is less than half the divergence angle when the internal laser mode is a Gaussian beam.

10. The method of clause 6, wherein the misalignment of the components in the interferometric device causes a symmetric lateral displacement of each of the two sub-beams in one plane that is less than half the beam field waist radial size and a symmetric angular offset of each the two sub-beams in the orthogonal plane that is less than half the divergence angle when the internal laser mode is a Gaussian beam.

11. The method of clause 10, wherein the ratio of the lateral displacement to the Gaussian beam field waist radial size is substantially equal to the ratio of the angular offset to the Gaussian beam divergence angle when the internal laser mode is a Gaussian beam.

12. The method of clause 8, wherein a mode transformed Hermite-Gaussian beam $HG_{01}$ or $HG_{10}$ is generated from the first output port of the interferometric device.

13. The method of clause 9, wherein a mode transformed Hermite-Gaussian beam $HG_{01}$ or $HG_{10}$ is generated from the first output port of the interferometric device.

14. The method of clause 10, wherein a mode transformed vortex Laguerre-Gaussian beam $LG_{01}$ or $LG_{0,-1}$ is generated from the first output port of the interferometric device.

15. The method of clause 10, wherein the sign of either the displacement or the angular offset is reversed to switch the vorticity direction of the Laguerre-Gaussian mode.

16. The method of clause 8, wherein the misalignment of the components in the interferometric device causes a symmetric lateral displacement of the two sub-beams in one plane that is less than half the beam field waist radial size and a symmetric angular offset of the two sub-beams in the orthogonal plane that is less than half the divergence angle of the underlying Gaussian beam of an internal laser mode that is a Laguerre-Gaussian beam.

17. The method of clause 16, wherein the internal laser mode is a Laguerre-Gaussian vortex beam with topological charge 1.

18. The method of clause 17, wherein a mode transformed output beam is generated from the first output port of the interferometric device that consists of a Laguerre-Gaussian mode of different order or superposition of Laguerre-Gaussian modes of different orders to the internal laser mode.

19. The method of clause 17, wherein a mode transformed output beam is generated from the first output port of the interferometric device that is a superposition of two Laguerre-Gaussian modes with topological charges of l+1 and l−1.

20. The method of clause 17, wherein a mode transformed output beam is generated from the first output port of the interferometric device that is a Laguerre-Gaussian mode with radial order p increased by one and with topological charge l decreased by one compared to the internal laser mode.

21. The method of any of clauses 1 to 3, wherein the wavefront of the internal laser mode is configured to be a plane wave at the interferometric device.

22. The method of any of clauses 1 to 3, where the misalignment of the components in the interferometric device causes a wavefront mismatch of the two sub-beams of the interferometer.

23. The method of any of clauses 1 to 3, wherein the magnitude of the misalignment is used to control the transmission of the output coupling from the laser.

24. The method of clause 3 when dependent on clause 2, wherein the interference conditions at the first and second output ports are achieved in a common-path interferometer such as a Sagnac interferometer.

25. The method of clause 3 when dependent on clause 2, wherein the interference conditions at the first and second output ports are achieved by allowing the laser cavity oscillation to self-select the wavelengths that are best matched to these conditions.

26. The method of clause 3 when dependent on clause 2, wherein the interference conditions at the first and second output ports are achieved by controlling the laser wavelength or wavelengths that are best matched to these conditions.

27. The method of any of clauses 1 to 3, wherein additional mode transformed outputs are produced from the same laser by arranging further interferometric devices that further complete the laser cavity and are also configured to be misaligned and provide mode transformed outputs.

28. An apparatus for generating a spatial transformation of the output from a laser system, the apparatus comprising:
a laser gain medium disposed within a laser cavity structure; and
an interferometric device arranged to complete the laser cavity structure, wherein the interferometric device is configured to receive an input beam from laser oscillation in the laser cavity structure, to split the input beam into two sub-beams, and to recombine the two sub-beams to provide a feedback beam to sustain laser oscillation;
wherein components of the interferometric device are configured to provide relative misalignment of the two sub-beams that are produced internally to the interferometric device;
at least a first output port of the interferometric device is configured to provide an output beam of the laser system that due to the misalignment is a spatial transformation of the internal mode structure of the laser; and
at least a second output port of the interferometric device is configured to provide the feedback beam to the laser cavity structure to sustain laser oscillation with a spatial structure that substantially preserves the internal mode structure of the laser.

29. The apparatus of clause 28, wherein the laser gain medium is one or more of the following: a solid-state gain medium; a diode-pumped solid-state gain medium; a fibre laser amplifier gain medium; a gas laser gain medium; a liquid laser gain medium.

30. The apparatus of clause 28, wherein the interferometric device is a common-path interferometer.

31. The apparatus of clause 30, wherein the common-path interferometric device is a Sagnac interferometer.

32. The apparatus of clause 28, wherein the interferometric device is a Mach-Zehnder interferometer.

33. The apparatus of clause 28, wherein the interferometric device is a Fabry-Perot interferometer.

34. The apparatus of clause 28, wherein the interferometric device is a Michelson interferometer.

35. The apparatus of clause 28, wherein the components of the interferometric device include two mirrors or two reflecting surfaces angled in opposition to cause a displacement misalignment of the two sub-beams travelling in opposite directions through a common path interferometer.

36. The apparatus of clause 28, wherein the components of the interferometric device include an angled parallel glass plate to cause a displacement misalignment of the two sub-beams travelling in opposite directions through a common path interferometer.

37. The apparatus of clause 28, wherein the components of the interferometric device include a mirror or reflecting surface to cause an angular offset misalignment by the angular deviation of the two sub-beams travelling in opposite directions through a common path interferometer.

38. The apparatus of clause 28, wherein the components of the interferometric device include a separate mirror in each sub-beam path to cause an angular offset misalignment of each sub-beam in opposite senses.

39. The apparatus of clause 28, wherein the components of the interferometric device include a set of mirrors to cause a combined displacement misalignment in one plane by a pair of oppositely angled mirrors and angular offset in an orthogonal plane by a further mirror of each sub-beam travelling in opposite directions through a common-path interferometer.

40. The apparatus of clause 28, wherein the components of the interferometric device include an angled parallel glass plate in each sub-beam path to cause a displacement misalignment of the two sub-beams in opposite senses.

41. The apparatus of clause 28, wherein the components of the interferometric device include a separate mirror in each sub-beam path to cause an angular offset misalignment of each sub-beam in opposite senses.

42. The apparatus of clause 28, wherein the components of the interferometric device include a mirror and an angled parallel plate in each sub-beam path to cause a combined displacement and angular misalignment in orthogonal planes of each sub-beam.

43. The apparatus of clause 28, wherein the components of the interferometric device include a lens displaced from the mid-point of a common path interferometer to cause a wavefront mismatch of the two sub-beams travelling in opposite directions of the common path.

44. The apparatus of clause 28, wherein the components of the interferometric device include a separate lens in the path of each sub-beam to cause a wavefront mismatch of the two sub-beams, the lenses having different focal lengths or the same focal length but placed in unequal relative location.

45. The apparatus of clause 28, wherein the laser cavity structure incorporates further interferometric devices with misalignment and these further complete the laser cavity and provide further mode transformed outputs.

46. The apparatus of clause 28, further comprising laser intracavity elements and means for controlling the intracavity elements to adapt and stabilise the wavelength of laser oscillation to achieve destructive interference at the first output port and constructive interference at the second output port, such as a mirror with a piezoelectric adjustment control.

47. The apparatus of clause 28, further comprising laser intracavity elements to cause pulsed operation by Q-switching or modelocking, such as electro-optic or acousto-optic devices or saturable absorbers.

48. The apparatus of clause 28, further comprising laser intracavity elements to cause wavelength selection or tunability, such as Fabry-Perot etalons, birefringent tuning filters, diffraction gratings or prisms.

49. The apparatus of clause 28, further comprising laser intracavity elements to cause unidirectional operation of a ring laser cavity, such as a Faraday isolator.

The invention claimed is:

1. A method for generating a spatial transformation of the internal mode of a laser, the method comprising:
    disposing a laser gain medium within a laser cavity structure;
    arranging an interferometric device comprising optical components to complete the laser cavity structure, wherein the interferometric device receives an input beam from laser oscillation in the laser cavity structure, splits the input beam into two sub-beams, and recombines the two sub-beams to provide an optical feedback beam to sustain laser oscillation;
    configuring the optical components that comprise the interferometric device to provide relative misalignment of the two sub-beams that are produced internally to the interferometric device;
    using at least a first output port of the interferometric device to provide an output beam of the laser that due to the misalignment is a spatial transformation of the internal mode structure of the laser; and
    using at least a second output port of the interferometric device to provide the optical feedback beam to the laser cavity structure that sustains laser oscillation with a spatial structure that substantially preserves the internal mode structure of the laser;
    wherein the misalignment of the optical components in the interferometric device causes a symmetric lateral displacement of each of the two sub-beams in one plane that is less than half the beam field waist radial size, or a symmetric angular offset of each of the two sub-beams in one plane that is less than half the divergence angle of the internal mode of the laser;
    wherein the internal mode of the laser is a Gaussian beam; and
    wherein a mode transformed Hermite-Gaussian beam $HG_{01}$ or $HG_{10}$ is generated and emitted from the first output port of the interferometric device.

2. The method of claim 1, wherein the two sub-beams destructively interfere at the first output port of the interferometric device.

3. The method of claim 2, wherein the two sub-beams constructively interfere at the second output port of the interferometric device,
    achieved in a common-path interferometer, one example of which being a Sagnac interferometer,
    or achieved by allowing the laser cavity oscillation to self-select the wavelengths to produce the interference conditions,
    or achieved by controlling the laser wavelength or wavelengths to produce the interference conditions.

4. The method of claim 1, wherein the two sub-beams constructively interfere at the second output port of the interferometric device.

5. The method of claim 1, wherein the internal laser mode is configured to have a plane wavefront at the interferometric device;
    or where the misalignment of the optical components that comprise the interferometric device causes a wavefront mismatch of the two sub-beams of the interferometer;
    or wherein the degree of the misalignment of the optical components that comprise the interferometric device is chosen to control the power of the output beam from the laser;
    or wherein the two sub-beams are substantially equal in amplitude.

6. The method of claim 1, wherein additional mode transformed outputs are produced from the same laser by arranging further interferometric devices that further complete the laser cavity and are also configured to be misaligned and provide mode transformed outputs.

7. A method for generating a spatial transformation of the internal mode of a laser, the method comprising:
    disposing a laser gain medium within a laser cavity structure;
    arranging an interferometric device comprising optical components to complete the laser cavity structure, wherein the interferometric device receives an input beam from laser oscillation in the laser cavity structure, splits the input beam into two sub-beams, and recombines the two sub-beams to provide an optical feedback beam to sustain laser oscillation;
    configuring the optical components that comprise the interferometric device to provide relative misalignment of the two sub-beams that are produced internally to the interferometric device;
    using at least a first output port of the interferometric device to provide an output beam of the laser that due to the misalignment is a spatial transformation of the internal mode structure of the laser; and
    using at least a second output port of the interferometric device to provide the optical feedback beam to the laser cavity structure that sustains laser oscillation with a spatial structure that substantially preserves the internal mode structure of the laser;
    wherein the misalignment of the optical components in the interferometric device causes a symmetric lateral displacement of each of the two sub-beams in one plane that is less than half the beam field waist radial size and a symmetric angular offset of each the two sub-beams in an orthogonal plane that is less than half the divergence angle of the internal mode of the laser; when the internal mode of the laser is a Gaussian beam; and
    wherein a mode transformed vortex Laguerre-Gaussian beam $LG_{01}$ or $LG_{0-1}$ is generated from the first output port of the interferometric device.

8. The method of claim 7, the ratio of the lateral displacement to the beam field waist radial size is substantially equal to the ratio of the angular offset to the divergence angle of the internal mode of the laser.

9. The method of claim 7,
    or wherein the sign of either the displacement or the angular offset is reversed to switch the vorticity direction of the mode transformed Laguerre-Gaussian beam from the first output port of the interferometric device.

10. An apparatus for generating a spatial transformation of the internal mode of a laser, the apparatus comprising:
    a laser gain medium disposed within a laser cavity structure; and
    an interferometric device comprising optical components arranged to complete the laser cavity structure, wherein the interferometric device is configured to receive an input beam from laser oscillation in the laser cavity structure, to split the input beam into two sub-beams, and to recombine the two sub-beams to provide an optical feedback beam to sustain laser oscillation;

wherein the optical components that comprise the interferometric device are configured to provide relative misalignment of the two sub-beams that are produced internally to the interferometric device;

at least a first output port of the interferometric device is configured to provide an output beam of the laser that due to the misalignment is a spatial transformation of the internal mode structure of the laser; and at least a second output port of the interferometric device is configured to provide the optical feedback beam to the laser cavity structure to sustain laser oscillation with a spatial structure that substantially preserves the internal mode structure of the laser, wherein the misalignment of the optical components in the interferometric device causes a symmetric lateral displacement of each of the two sub-beams in one plane that is less than half the beam field waist radial size, or a symmetric angular offset of each of the two sub-beams in one plane that is less than half the divergence angle of the internal mode of the laser;

wherein the internal mode of the laser is a Gaussian beam; and wherein a mode transformed Hermite-Gaussian beam $HG_{01}$ or $HG_{10}$ is generated and emitted from the first output port of the interferometric device.

11. The apparatus of claim 10, wherein the laser gain medium is one or more of the following: a solid-state gain medium; a diode-pumped solid-state gain medium; a fibre laser amplifier gain medium; a gas laser gain medium; a liquid laser gain medium.

12. The apparatus of claim 10, wherein the interferometric device is a common-path interferometer, optionally wherein the common-path interferometric device is a Sagnac interferometer;

or wherein the interferometric device is a Mach-Zehnder interferometer;

or wherein the interferometric device is a Fabry-Perot interferometer;

or wherein the interferometric device is a Michelson interferometer.

13. The apparatus of claim 10, wherein the components of the interferometric device include two mirrors or two reflecting surfaces angled in opposition to cause a displacement misalignment of the two sub-beams travelling in opposite directions through a common path interferometer;

or wherein the components of the interferometric device include an angled parallel glass plate to cause a displacement misalignment of the two sub-beams travelling in opposite directions through a common path interferometer;

or wherein the components of the interferometric device include a mirror or reflecting surface to cause an angular offset misalignment by the angular deviation of the two sub-beams travelling in opposite directions through a common path interferometer;

or wherein the components of the interferometric device include a separate mirror in each sub-beam path to cause an angular offset misalignment of each sub-beam in opposite senses;

or wherein the components of the interferometric device include a set of mirrors to cause a combined displacement misalignment in one plane by a pair of oppositely angled mirrors and angular offset in an orthogonal plane by a further mirror of each sub-beam travelling in opposite directions through a common-path interferometer;

or wherein the components of the interferometric device include an angled parallel glass plate in each sub-beam path to cause a displacement misalignment of the two sub-beams in opposite senses;

or wherein the components of the interferometric device include a separate mirror in each sub-beam path to cause an angular offset misalignment of each sub-beam in opposite senses;

or wherein the components of the interferometric device include a mirror and an angled parallel plate in each sub-beam path to cause a combined displacement and angular misalignment in orthogonal planes of each sub-beam;

or wherein the components of the interferometric device include a lens displaced from the mid-point of a common path interferometer to cause a wavefront mismatch of the two sub-beams travelling in opposite directions of the common path;

or wherein the components of the interferometric device include a separate lens in the path of each sub-beam to cause a wavefront mismatch of the two sub-beams, the lenses having different focal lengths or the same focal length but placed in unequal relative location;

or wherein the laser cavity structure incorporates further interferometric devices with misalignment and these further complete the laser cavity and provide further mode transformed outputs.

14. The apparatus of claim 10, further comprising laser intracavity elements and a controller for controlling the intracavity elements, to adapt and stabilise the wavelength of laser oscillation to achieve destructive interference at the first output port and constructive interference at the second output port, and thereby achieve a spatially transformed output beam, optionally wherein the intracavity elements and the controller comprise a mirror with a piezoelectric adjustment control;

or further comprising laser intracavity elements to cause pulsed operation by Q-switching or modelocking, such as electro-optic or acousto-optic devices or saturable absorbers.

15. The apparatus of claim 10, further comprising laser intracavity elements to cause wavelength selection or tunability, such as Fabry-Perot etalons, birefringent tuning filters, diffraction gratings or prisms;

or further comprising laser intracavity elements to cause unidirectional operation of a ring laser cavity, such as a Faraday isolator.

* * * * *